(12) United States Patent
Noguchi et al.

(10) Patent No.: US 7,940,963 B2
(45) Date of Patent: May 10, 2011

(54) MONITORING SYSTEM, MONITORING METHOD, AND PROGRAM

(75) Inventors: Yukinori Noguchi, Kanagawa (JP); Tetsuya Takamori, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 802 days.

(21) Appl. No.: 11/965,603

(22) Filed: Dec. 27, 2007

(65) Prior Publication Data
US 2008/0159597 A1    Jul. 3, 2008

(30) Foreign Application Priority Data

Dec. 27, 2006  (JP) ................................. 2006-353192
Dec. 14, 2007  (JP) ................................. 2007-323646

(51) Int. Cl.
*G06K 9/00* (2006.01)
(52) U.S. Cl. ........ 382/107; 382/106; 382/278; 382/103; 382/275; 382/192; 348/155; 348/169; 348/172; 348/143; 345/173; 702/142; 396/104
(58) Field of Classification Search .................. 382/167, 382/106, 162, 107, 103; 348/155, 169, 152, 348/154, 172; 345/582, 592; 715/788, 781
See application file for complete search history.

(56) References Cited

U.S. PATENT DOCUMENTS

| | | | | |
|---|---|---|---|---|
| 4,979,029 A * | 12/1990 | Lemelson | ..................... | 348/94 |
| 6,011,901 A * | 1/2000 | Kirsten | ..................... | 386/226 |
| 6,445,409 B1 * | 9/2002 | Ito et al. | ..................... | 348/155 |
| 6,462,773 B1 * | 10/2002 | Koga | ..................... | 348/143 |
| 6,879,709 B2 * | 4/2005 | Tian et al. | ..................... | 382/118 |
| 7,139,411 B2 * | 11/2006 | Fujimura et al. | ..................... | 382/103 |
| 2005/0018049 A1 * | 1/2005 | Falk | ..................... | 348/207.99 |
| 2006/0203903 A1 * | 9/2006 | Shih et al. | ..................... | 375/240.01 |

FOREIGN PATENT DOCUMENTS

| | | | |
|---|---|---|---|
| JP | 2004-200989 | * | 7/2004 |
| JP | 2004-200989 A | | 7/2004 |

* cited by examiner

*Primary Examiner* — Daniel G Mariam
*Assistant Examiner* — Nancy Bitar
(74) *Attorney, Agent, or Firm* — Birch, Stewart, Kolasch & Birch, LLP

(57) ABSTRACT

A monitoring system includes: an image capturing section capturing a motion image of a monitor region; a condition storing section storing a condition of an object to be extracted from the motion image; a matching judging section judging whether an object that matches the condition exists in the motion image; an object region identifying section identifying an object region including the object, if the matching judging section judges positively; an output section outputting an image of the object region, if the matching judging section judges positively; an image retaining section retaining an image of a region other than the object region, if the matching judging section judges positively; and an output control section controlling the output section to output the image of the region, if the image of the region is judged to be transmitted, after the image retaining section retained the image of the region.

23 Claims, 16 Drawing Sheets

| MOTION SPEED \ HUMAN BEING AREA | S < S1 | S1 ≤ S < S2 | S2 ≤ S < S3 | S3 ≤ S |
|---|---|---|---|---|
| V < V1 | NOT TRANSMITTED | PR3 FR1 | PR2 FR1 | PR1 FR1 |
| V1 ≤ V < V2 | PR4 FR2 | PR3 FR2 | PR2 FR2 | PR1 FR2 |
| V2 ≤ V < V3 | PR4 FR3 | PR3 FR3 | PR2 FR3 | PR1 FR3 |
| V3 ≤ V | PR4 FR4 | PR3 FR4 | PR2 FR4 | PR1 FR4 |

262

RESOLUTION: PR4 > PR3 > PR2 > PR1
DISPLAY RATE: FR4 > FR3 > FR2 > FR1

| LOWER LIMIT VALUE | THE HUMAN BEING AREA | THE MOTION SPEED | THE AREA OF THE CHANGE REGION | THE AREA OF THE PECULIAR COLOR | THE MATCHING LEVEL OF THE FORM | THE MATCHING LEVEL IN THE DIRECTIONS |
|---|---|---|---|---|---|---|
| | S1 | V1 | $s\alpha$ | $s\beta$ | $s\gamma$ | md |

240

MONITORING SYSTEM, MONITORING METHOD, AND PROGRAM

CROSS REFERENCE TO RELATED APPLICATION

The present application claims priority from Japanese Patent Applications No. 2006-353192 filed on Dec. 27, 2006, and No. 2007-323646 filed on Dec. 14, 2007 the contents of which are incorporated herein by reference.

BACKGROUND

1. Technical Field

The present invention relates to a monitoring system, a monitoring method, and a program. In particular, the present invention relates to a monitoring system, a monitoring method, and a program for the monitoring system, which are for pursuing monitoring using an image.

2. Description of the Related Art

Such an image capturing apparatus is known to reduce the frame rate for image capturing by the image capturing section by relatively lengthening the period for the synchronization signal to be supplied to the image capturing section while the motion vector detected by the motion image compression section is less than a predetermined value, and to increase the frame rate for image capturing by relatively shortening the period for the synchronization signal while the motion vector is the predetermined value or more (e.g. Japanese Patent Application Publication No. 2004-200989).

SUMMARY

However, the image capturing apparatus disclosed in Patent Document 1 captures an image at a low frame rate while no motion has been detected, and increases the image capturing frame rate or increases the image capturing resolution when a motion having a predetermined value or more has been detected from the image at the low frame rate under image capturing. Therefore, according to the image capturing apparatus recited in Japanese Patent Application Publication No. 2004-200989, the data amount of a monitor image generated when a motion has been detected will be extremely large. When such a monitor image is attempted to be transmitted to outside, it sometimes takes a great amount of time before the monitor image reaches the transmission destination. This may cause a problem that a surveyor cannot inspect the monitor image swiftly, thereby preventing swift measures from being taken against a suspicious person.

In view of this, it is an object of an aspect of the innovations herein to provide a monitoring system, a monitoring method, and a program that are capable of overcoming the above drawbacks accompanying the related art. The above and other objects can be achieved by combinations described in the independent claims. The dependent claims define further advantageous and exemplary combinations of the present invention.

According to the first aspect related to the innovations herein, there is provided a monitoring system including: an image capturing section that captures a motion image of a monitor region; a condition storing section that stores a condition of an object to be extracted from the motion image captured by the image capturing section; a matching judging section that judges whether an object that matches the condition exists in the motion image captured by the image capturing section; an object region identifying section that identifies an object region that includes the object that matches the condition, if the matching judging section has judged that the object that matches the condition exists; an output section that outputs an image of the object region, if the matching judging section has judged that the object that matches the condition exists; an image retaining section that retains an image of a region other than the object region, if the matching judging section has judged that the object that matches the condition exists; and an output control section that controls the output section to output the image of the region other than the object region retained in the image retaining section, if it is judged that the image of the region other than the object region retained in the image retaining section is to be transmitted, after the image retaining section retained the image of the region other than the object region.

The monitoring system may further include a permissible data amount obtaining section that obtains a data amount permitted to be outputted from the output section per unit time, the output section may output an image of the object if the matching judging section has judged that there does not exist any object that matches the condition, and if the matching judging section has judged that there does not exist any object that matches the condition in the motion image of the monitor region after the image retaining section retained in the image of the region other than the object region, the output control section may control the output section to output the image of the region other than the object region retained in the image retaining section, on condition that the data amount obtained by the permissible data amount obtaining section is larger than a predetermined value.

Moreover, according to the second aspect related to the innovations herein, there is provided a monitoring method including: an image capturing step of capturing a motion image of a monitor region; a condition storing step of storing a condition of an object to be extracted from the motion image captured in the image capturing step; a matching judging step of judging whether an object that matches the condition exists in the motion image captured in the image capturing step; an object region identifying step of identifying an object region that includes the object that matches the condition, if the object that matches the condition is judged to exist in the matching judging step; an output step of outputting an image of the object region, if the object that matches the condition is judged to exist in the matching judging step; an image retaining step of retaining an image of a region other than the object region, if the object that matches the condition is judged to exist in the matching judging step; and an output control step of controlling to output, in the output step, the image of the region other than the object region retained in the image retaining step, if it is judged that the image of the region other than the object region retained in the image retaining step is to be transmitted, after the image of the region other than the object region is retained in the image retaining step.

Moreover, according to the third aspect related to the innovations herein, there is provided a program for use in a monitoring system, the program causing the monitoring system to function as: an image capturing section that captures a motion image of a monitor region; a condition storing section that stores a condition of an object to be extracted from the motion image captured by the image capturing section; a matching judging section that judges whether an object that matches the condition exists in the motion image captured by the image capturing section) an object region identifying section that identifies an object region that includes the object that matches the condition, if the matching judging section has judged that the object that matches the condition exists; an output section that outputs an image of the object region, if the matching judging section has judged that the object that matches the condition exists; an image retaining section that retains an image of a region other than the object region, if the matching judging section has judged that the object that matches the condition exists; and an output control section that controls the output section to output the image of the region other than the object region retained in the image retaining section, if it is judged that the image of the region other than the object region retained in the image retaining section is to be transmitted, after the image retaining section retained the image of the region other than the object region.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

According to the present invention, it becomes possible to provide a monitoring system capable of providing a detailed monitor image without unnecessarily increasing the data amount required to transmit a monitor image per unit time.

BRIEF DESCRIPTION OF THE DRAWINGS

FIG. 5 shows one example of image quality information stored in an image quality storing section 262.

FIG. 12 shows one example of a condition stored in a condition storing section 240.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
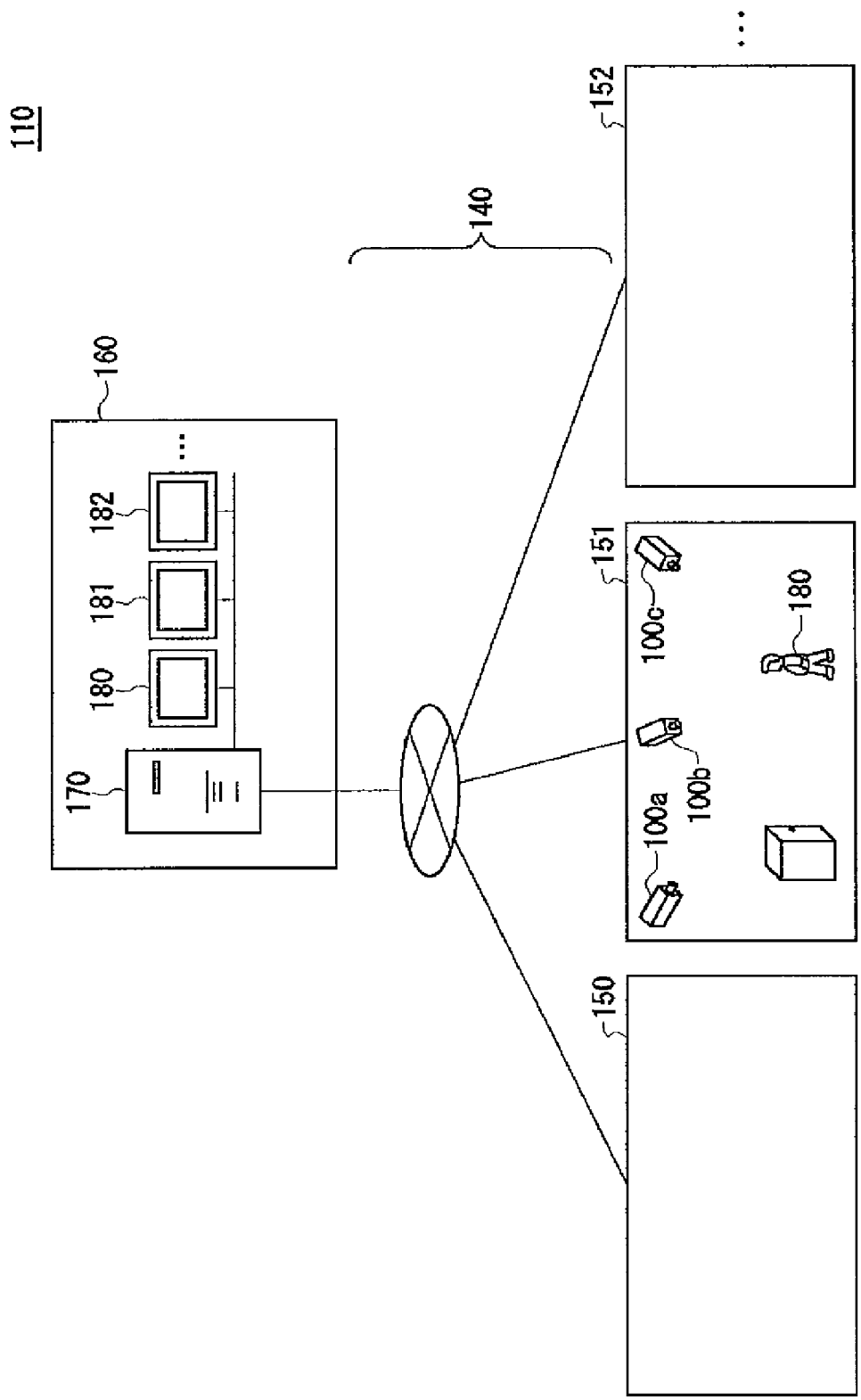
FIG. 1 shows one example of an environment in which a monitoring system 110 is used.

FIG. 1 shows one example of an environment in which a monitoring system 110 is used according to one embodiment. The monitoring system 110 includes a plurality of image capturing apparatuses 100a-c, a transmission path 140, a server 170, and a plurality of display apparatuses 180, 181, 182, . . . . The server 170 and the plurality of display apparatuses 180, 181, 182, . . . are provided in a monitoring room 160 remote from the monitor regions 150, 151, 152, . . . . Note that the image capturing apparatuses 100a-c are provided with respect to the plurality of monitor regions 150, 151, 152, . . . respectively, for capturing images of the plurality of monitor regions 150, 151, 152, . . . , Hereinafter, the image capturing apparatuses 100a-c provided with respect to the plurality of monitor regions 150, 151, 152, . . . , respectively are collectively referred to as an image capturing apparatus 100.

The image capturing apparatus 100 transmits motion images resulting from capturing images of the monitor regions 150, 151, 152, . . . , to the server 170 via the transmission path 140. The server 170 causes the display apparatuses 180, 181, 182, . . . to display a motion image received from the image capturing apparatus 100. The display apparatuses 180, 181, 182, . . . display the motion images of the monitor regions 150, 151, 152, . . . respectively.

The image capturing apparatus 100 captures a motion image of a frame image having a higher resolution than the monitor resolution displayable by the display apparatuses 180, 181, 182, . . . at higher frame rate than the monitor display rate being the display rate of the motion image displayable by the display apparatuses 180, 181, 182 . . . . Then while no person or change is detected in the captured motion image, the image capturing apparatus 100 continues to convert a motion image captured by the image capturing apparatus 100 into a motion image where a frame image of a resolution of the monitor resolution or less is displayed at a rate of the monitor display rate or less and to transmit the resulting motion image to the server 170.

Then once a person or change is detected in the motion image, the image capturing apparatus 100 continues to transmit the high resolution and high-frame-rate motion image having been captured, to the server 170 until the person or change stops to be detected in the motion image. The server 170 records the received motion image having been received from the image capturing apparatus 100, and causes the display apparatuses 180, 181, 182, . . . to display the received motion image in accordance with the monitor resolution and the monitor display rate.

For example, the image capturing apparatus 100 detects change from an averaged image obtained by chronologically averaging a plurality of frame images obtained by image capturing, or detects a person included in the averaged image. For example, the image capturing apparatus 100 detects that there is a change in the motion image, if the area of the region from which a change has been detected in the chronologically consecutive averaged images is a predetermined threshold value or more. When a person or a change has been detected in the motion image, the image capturing apparatus 100 generates a frame image having a resolution at the time of image capturing at least in a partial region from which the person or the change has been detected, and transmits a motion image that includes the generated frame image, to the server 170. In addition, when having detected a motion of a person, the image capturing apparatus 100 generates a frame image having a resolution at the time of image capturing at least in a partial region designated to widen towards the motion direction of the person, and transmits a motion image that includes the generated frame image, to the server 170.

In addition, the image capturing apparatus 100 may transmit a motion image where a partial region from which a person or a change has been detected is designated as a frame image, to the server 170. In pursuing this operation, the image capturing apparatus 100 retains a partial image corresponding to a region other than the partial region from which a person or a change has been detected. As described above, when any person or change has stopped being detected, the image capturing apparatus 100 transmits a frame image whose image quality is decreased, to the server 170. According to this arrangement, while no person or change is detected the data amount transmitted in the transmission path 140 is decreased. Accordingly, the image capturing apparatus 100 may transmit the retained partial image to the server 170 during this period.

In addition, the server 170 causes the image capturing apparatus 100 to designate a larger threshold value, if the difference between the data amount transmittable by the transmission path 140 per unit time and the data amount transmitted by the image capturing apparatus 100 per unit time is small. According to this arrangement, it is possible to prevent, in advance, the delay in arrival of motion image data incident to increased data amount transmitted in the transmission path 140.

Note that the monitor regions 150, 151, 152, . . . may be spaces in different buildings, or different spaces from each other in the same building. For example, the monitor regions 150, 151, 152, . . . may be passages between shelves in a shop. Moreover, it is needless to say that the monitor regions 150, 151, 152, . . . may alternatively be open spaces not surrounded by any building, not limited to spaces within a building.

Figure 2:
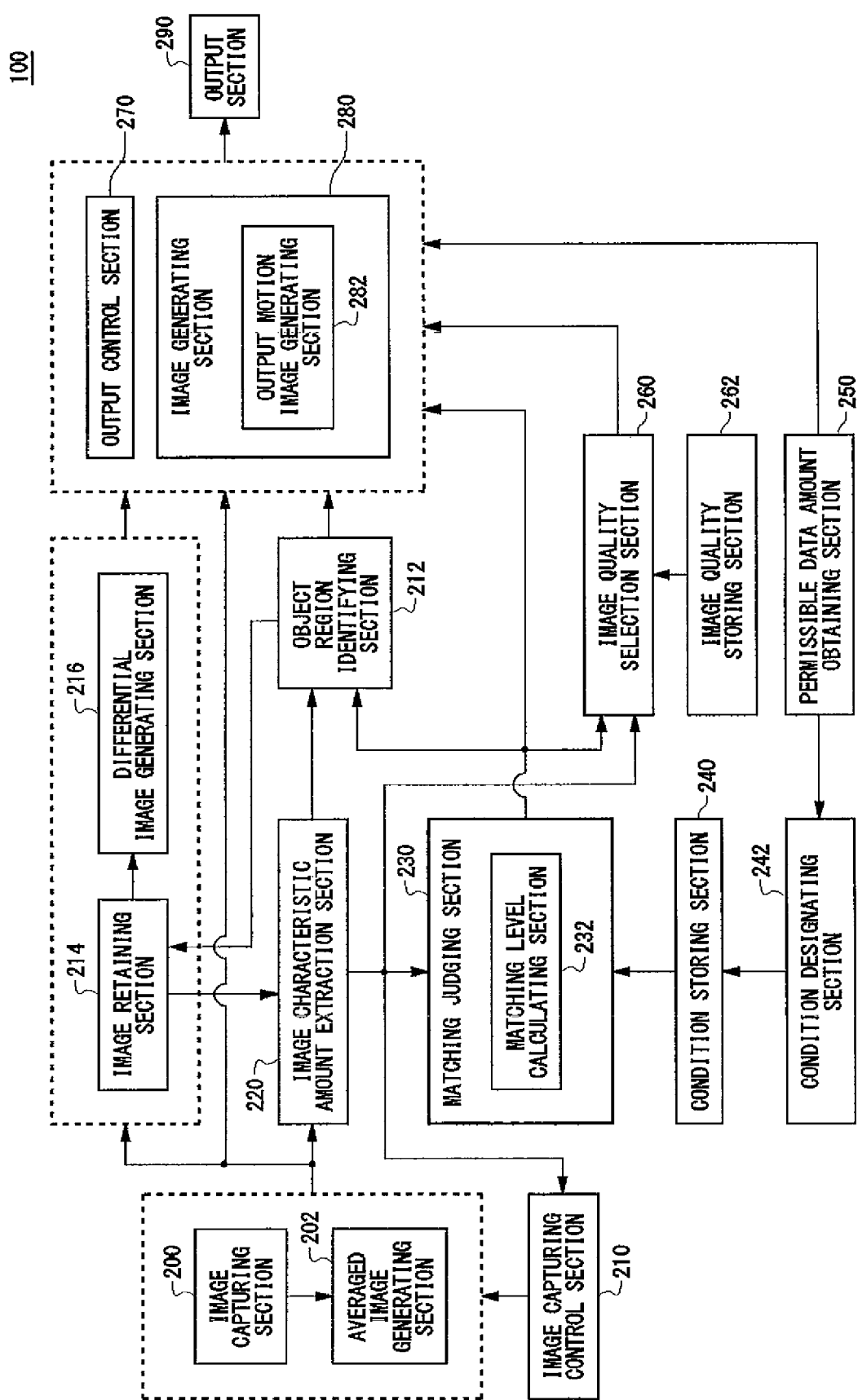
FIG. 2 shows one example of a block configuration of an image capturing apparatus 100.
Figure 3:
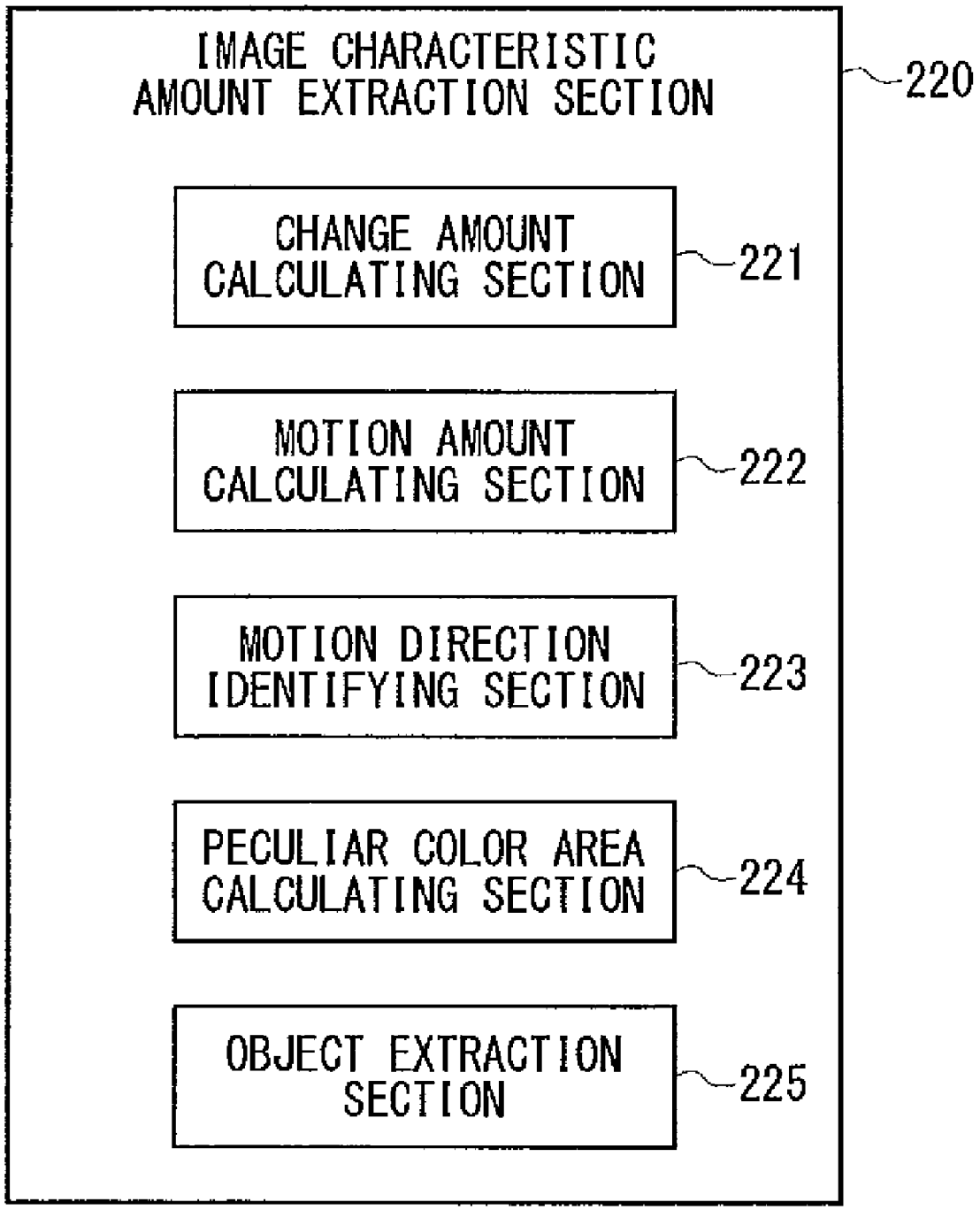
FIG. 3 shows one example of a block configuration of an image characteristic amount extraction section 220.

FIG. 2 shows one example of a block configuration of the image capturing apparatus 100. The image capturing apparatus 100 includes an image capturing section 200, an averaged image generating section 202, an image capturing control section 210, an object region identifying section 212, an image retaining section 214, a differential image generating section 216, an image characteristic amount extraction section 220, a matching judging section 230, a condition storing section 240, a condition designating section 242, a permissible data amount obtaining section 250, an image quality selection section 260, an image quality storing section 262, an output control section 270, an image generating section 280, and an output section 290. The matching judging section 230 includes a matching level calculating section 232. In addition, the image generating section 280 includes an output motion image generating section 282. FIG. 3 shows one example of a block configuration of an image characteristic amount extraction section 220. The image characteristic amount extraction section 220 includes a change amount calculating section 221, a motion amount calculating section 222, a motion direction identifying section 223, a peculiar color area calculating section 224, and an object extraction section 225.

The image capturing section 200 captures an image of a monitor region. To be more specific, the image capturing section 200 captures a motion image of a monitor region. The averaged image generating section 202 generates an averaged image resulting from averaging a plurality of motion image constituting images included in the motion image captured by the image capturing section 200. For example, the averaged image generating section 202 generates an averaged image, by averaging a plurality of motion image constituting images for each pixel. Note that the condition storing section 240 stores a condition that matches an averaged image resulting from averaging a plurality of motion image constituting images included in the motion image judged as being abnormal.

The matching judging section 230 judges whether the averaged image generated by the averaged image generating section 202 matches the condition or not. Then when the matching judging section 230 has judged that the averaged image does not match the condition, the output motion image generating section 282 generates an output motion image that includes a motion image constituting image of a lower image quality than in a case where the matching judging section 230 judges that the averaged image matches the condition, from the motion image constituting images included in the motion image captured by the image capturing section 200. Then the output section 290 outputs an output motion image generated by the output motion image generating section 282. For example, the output section 290 outputs an output motion image generated by the output motion image generating section 282, to the transmission path 140 transmitting the motion image of the monitor region captured by the plurality of image capturing sections 200. Note that the output section 290 may output the motion image of the monitor region captured by the image capturing section 200. For example, the output section 290 may output a motion image captured by the image capturing section 200 if the matching judging section 230 has judged that the averaged image matches the condition.

To be more specific, when the matching judging section 230 has judged that the averaged image does not match the condition, the output motion image generating section 282 generates an output motion image including a motion image constituting image of a lower resolution than in a case where the matching judging section 230 judges that the averaged image matches the condition. In addition, when the matching judging section 230 has judged that the averaged image does not match the condition, the output motion image generating section 282 may generate an output motion image including a motion image constituting image of a lower gray scale than in a case where the matching judging section 230 judges that the averaged image matches the condition. In addition, when the matching judging section 230 has judged that the averaged image does not match the condition, the output motion image generating section 282 may generate an output motion image having a display rate lower than in the case where the matching judging section 230 judges that the averaged image matches the condition, from the motion image captured by the image capturing section 200.

Note that the output motion image generating section 282 may generate an output motion image including an averaged image generated by the averaged image generating section 202 when the matching judging section 230 has judged that the averaged image does not match the condition, and designate a motion image captured by the image capturing section 200 as an output motion image when the matching judging section 230 has judged that the averaged image matches the condition.

The differential image generating section 216 generates a differential image between a first averaged image generated by the averaged image generating section 202 and a second averaged image generated by the averaged image generating section 202 using the motion image constituting image captured after any of the motion image constituting images used for generating the first averaged image. Then the output motion image generating section 282 may generate an output motion image including the differential image generated by the differential image generating section 216 when the matching judging section 230 has judged that the averaged image does not match the condition, and designate the motion image captured by the image capturing section 200 as an output motion image when the matching judging section 230 has judged that the averaged image matches the condition.

The permissible data amount obtaining section 250 obtains the data amount per unit time permitted to be outputted from the output section 290. For example, the permissible data amount obtaining section 250 may obtain the data amount transmittable by the transmission path 140 per unit time and the data amount capacity that the output control apparatus 172 is able to process per unit time. Then when the matching judging section 230 has judged that the averaged image does not match the condition, the output motion image generating section 282 generates an output motion image including a differential image generated by the differential image generating section 216, further on condition that the data amount obtained by the permissible data amount obtaining section 250 is smaller than a predetermined value.

Note that the matching judging section 230 may judge whether each of the plurality of partial regions in the averaged image matches a condition or not. Then the output motion image generating section 282 may generate, in the region other than a matching region being a region judged to match the condition by the matching judging section 230, an output motion image including a motion image constituting image of a lower image quality than in the matching region.

Note that the object extraction section 225 extracts an object that matches a predetermined condition, from motion images captured by the image capturing section 200. To be more specific, the object extraction section 225 extracts an object that matches a condition stored in the condition storing section 240, from motion image constituting images included in a motion image captured by the image capturing section 200. Then the image generating section 280 converts the motion image captured by the image capturing section 200 into a motion image of a lower image quality, if the size of the object extracted by the object extraction section 225 is larger. Then the output section 290 outputs the motion image obtained by conversion by the image generating section 280. In this case, the image generating section 280 may convert the motion image captured by the image capturing section 200 into a motion image of a lower resolution, if the size of the object extracted by the object extraction section 225 is larger.

In addition, the motion amount calculating section 222 calculates the motion amount of the object extracted by the object extraction section 225, between the plurality of motion image constituting images included in the motion image captured by the image capturing section 200. The condition storing section 240 stores a lower limit value of the motion amount of the object that the object to be extracted has to have. For example, the condition storing section 240 stores a lower limit value of the motion amount of the object between consecutive frames that the object to be extracted has to have. Then the object extraction section 225 extracts an object whose object motion amount calculated by the motion amount calculating section 222 is the lower limit value of the motion amount stored in the condition storing section 240 or more, from the plurality of motion image constituting images included in the motion image captured by the image capturing section 200. Then when the size of the object extracted by the object extraction section 225 is larger, the image generating section 280 converts the motion image captured by the image capturing section 200 into a motion image of a lower resolution. To be more specific, the image generating section 280 converts the motion image captured by the image capturing section 200 into a motion image of a lower display rate, if the motion amount of the object calculated by the motion amount calculating section 222 is larger.

Note that the image quality storing section 262 stores a combination of a display rate of a motion image and an image quality of motion image constituting images included in the motion image, in association with the size of the object and the motion amount of the object. Then the image quality selection section 260 selects a combination of the image quality and the display rate stored in the image quality storing section 262 in association with the size of the object extracted by the object extraction section 225 and the motion amount of the object calculated by the motion amount calculating section 222. Then the image generating section 280 converts the motion image captured by the image capturing section 200, into a motion image resulting from display of a motion image constituting image of an image quality selected by the image quality selection section 260 at a display rate selected by the image quality selection section 260.

Note that the motion direction identifying section 223 identifies the motion direction of the object extracted by the object extraction section 225 based on the image content of the motion image captured by the image capturing section 200. The image generating section 280 generates a motion image constituting image that includes an object and whose image width of the motion direction is larger than the image width in the direction vertical to the motion direction, from the motion image constituting images included in the motion image captured by the image capturing section 200 by means of trimming. Then the output section 290 outputs a motion image including a motion image constituting image generated by the image generating section 280. Then the motion amount calculating section 222 calculates the motion amount of the object among the plurality of motion image constituting images, in the direction identified by the motion direction identifying section 223, based on the plurality of motion image constituting images included in the motion image captured by the image capturing section 200. Then when the motion amount calculated by the motion amount calculating section 222 is larger, the image generating section 280 generates a motion image constituting image whose image width in the motion direction identified by the motion direction identifying section 223 is larger, from the motion image constituting images included in the motion image captured by the image capturing section 200 by means of trimming. In this way, the image capturing apparatus 100 is able to provide a monitor image capable of adequately monitoring the region to which a suspicious person is moving while preventing unnecessary increase in data amount transmitted by the transmission path 140.

Note that the condition storing section 240 stores the lower limit of the change amount from the reference image to be detected in the motion image constituting image included in the motion image judged as being abnormal. Then the change amount calculating section 221 calculates the change amount from the reference image predetermined in the motion image captured by the image capturing section 200. For example, the change amount calculating section 221 calculates the change amount from the second motion image constituting image captured prior to the first motion image constituting image, in the first motion image constituting image included in the motion image captured by the image capturing section 200. Note that the change amount calculating section 221 calculates the change amount from the reference image, for the averaged image generated by the averaged image generating section 202. Note that the reference image may be a predetermined image of a monitor region, a motion image constituting image captured by the image capturing section 200 at the previous timing, or an averaged image generated at the previous timing. Then the matching judging section 230 judges that the averaged image matches the condition if the change amount calculated by the change amount calculating section 221 is the lower value of the change amount stored in the condition storing section 240 or more.

In addition, when the change amount calculated by the change amount calculating section 221 is smaller than the predetermined lower limit value of the change amount, the output control section 270 causes the output section 290 to output the motion image captured by the image capturing section 200 after converting the same into a motion image having a smaller data amount than in the case where the change amount calculated by the change amount calculating section 221 is the lower value or more. To be more specific, when the change amount from the reference image is smaller than the lower limit value, the output control section 270 causes the output section 290 to output the motion image captured by the image capturing section 200 by converting the same into a motion image of a lower resolution than in the case where the change amount from the reference image is the lower limit value or more. In addition, when the change amount from the reference image is smaller than the lower limit value, the output control section 270 may cause the output section 290 to output the motion image captured by the image capturing section 200 after converting the same into a motion image of a smaller gray scale than in the case where the change amount from the reference image is the lower limit value or more. Alternatively when the change amount from the reference image is smaller than the lower limit value, the output control section 270 causes the output section 290 to output the motion image captured by the image capturing section 200 after converting the same into a motion image of a display rate lower than in the case where the change amount from the reference image is the lower limit value or more. Note that the condition designating section 242 increases more the lower limit value stored in the condition storing section 240 if the data amount obtained by the permissible data amount obtaining section 250 is less.

Note that the change amount calculating section 221 may calculate the motion amount of the object indicating the same subject between the first motion image constituting image and the second motion image constituting image included in the motion image captured by the image capturing section 200. Then when the motion amount of the object calculated by the change amount calculating section 221 is smaller than the predetermined lower limit value of motion amount, the output control section 270 may cause the output section 290 to output the motion image captured by the image capturing section 200 into a motion image whose data amount is smaller than in the case where the motion amount calculated by the change amount calculating section 221 is the lower limit value of the motion amount or more. Note that the condition designating section 242 may increase the lower limit value of the motion amount, if the data amount obtained by the permissible data amount obtaining section 250 is smaller.

The condition storing section 240 stores the lower limit value of the matching level between the object included in the averaged image and the predetermined object, which is to be detected in the averaged image resulting from averaging the plurality of motion image constituting images included in the motion image judged as being abnormal. Then the object extraction section 225 extracts an object from the averaged image generated by the averaged image generating section 202. Then the matching judging section 230 judges that the averaged image matches the condition if the matching level between the object extracted by the object extraction section 225 and the predetermined object is the lower limit value stored in the condition storing section 240 or more. To be more specific, the matching level calculating section 232 calculates the matching level between the form of the object included in the motion image captured by the image capturing section 200 and the form of the predetermined reference object. Then the matching judging section 230 judges that the averaged image matches the condition if the matching level calculated by the matching level calculating section 232 is the lower limit value stored in the condition storing section 240 or more.

Note that, when the matching level calculated by the matching level calculating section 232 is smaller than the predetermined lower limit value of the matching level, the output control section 270 may cause the output section 290 to output the motion image captured by the image capturing section 200 after converting the same into a motion image whose data amount is smaller than in the case where the matching level calculated by the matching level calculating section 232 is the lower limit value or more. To be more specific, when the matching level calculated by the matching level calculating section 232 is smaller than the predetermined lower limit value of the form matching level, the output control section 270 causes the output section 290 to output the motion image captured by the image capturing section 200 after converting the same into a motion image whose data amount is smaller than in the case where the matching level calculated by the matching level calculating section 232 is the lower limit value of the form matching level or more. Note that the condition designating section 242 may increase the lower limit value of the form matching level, if the data amount obtained by the permissible data amount obtaining section 250 is smaller.

The condition storing section 240 stores the lower limit value of the area occupied by the color included in the predetermined color range, which is to be detected in the averaged image resulting from averaging the plurality of motion image constituting images included in the motion image judged as being abnormal. For example, the condition storing section 240 may store the lower limit value of the area occupied by the color included in the color range that includes a peculiar color to human being. Then the peculiar color area calculating section 224 calculates the area occupied by the color included in the predetermined color range, in the averaged image generated by the averaged image generating section 202. Then the matching judging section 230 judges that the averaged image matches the condition if the area calculated by the peculiar color area calculating section 224 is the lower limit value of the area stored in the condition storing section 240 or more. To be more specific, the matching level calculating section 232 calculates the color matching level between the color included in the object included in the motion image captured by the image capturing section 200 and the color included in the predetermined reference object. Then the matching judging section 230 judges that the averaged image matches the condition, if the matching level calculated by the matching level calculating section 232 is the lower limit value stored in the condition storing section 240 or more.

The condition storing section 240 stores the lower limit value of the matching level between the direction of the image capturing section 200 from the position of the subject included in the averaged image and the direction of the motion of the subject, which is to be detected in the averaged image resulting from averaging the plurality of motion image constituting images included in the motion image judged as being abnormal. Then the motion direction identifying section 223 identifies the motion direction of the subject in the monitor region, based on the image content of the plurality of averaged images generated by the averaged image generating section 202. Then the matching judging section 230 judges that the averaged image matches the condition, if the matching level between the direction of the motion of the subject and the direction of the image capturing section 200 from the position of the subject is the lower limit value of the matching level stored in the condition storing section 240 or more.

In addition, when the matching judging section 230 judges that there exists an object that matches a condition, the object region identifying section 212 identifies an object region that includes an object that matches the condition. Then the output section 290 outputs an image of the object region, if the matching judging section 230 judges that there exists an object that matches a condition. When the matching judging section 230 has judged that there exists an object that matches a condition, the image retaining section 214 retains an image of the region other than the object region. Then the output control section 270 controls the output section 290 to output the image of the region other than the object region retained in the image retaining section 214 if it is judged that the image of the region other than the object region retained in the image retaining section 214 is to be transmitted, after the image retaining section 214 retained the image of the region other than the object region.

Specifically, the output control section 270 controls the output section 290 to output the image of the region other than the object region retained in the image retaining section 214, if it is judged that the image of the region other than the object region retained in the image retaining section 214 is transmittable, after the image retaining section 214 retained the image of the region other than the object region. To be more specific, the output control section 270 controls the output section 290 to output the image of the region other than the object region retained in the image retaining section 214, if it is judged that a data amount of the motion image to be outputted from the output section 290 is smaller than a predetermined data amount, after the image retaining section 214 retained the image of the region other than the object region. To be more specific, the output control section 270 controls the output section 290 to output the image of the region other than the object region retained in the image retaining section 214, if it is judged that a data amount of the motion image to be outputted from the output section 290 per unit time is smaller than the data amount obtained by the permissible data amount obtaining section 250, after the image retaining section 214 retained the image of the region other than the object region.

Other than these, the output control section 270 controls the output section 290 to output the image of the region other than the object region retained in the image retaining section 214, within a range of the data amount permitted to be outputted from the output section 290. For example, the image generating section 280 may cause the output section 290 to output the image of the region other than the object region retained in the image retaining section 214, so as to reduce, down to the data amount obtained by the permissible data amount obtaining section 250, the data amount of the motion image outputted from the output section 290 per unit time.

Other than these, the output control section 270 controls the output section 290 to output the image of the region other than the object region retained in the image retaining section 214, if it is judged that the data amount obtained by the permissible data amount obtaining section 250 is larger than a predetermined value, after the image retaining section 214 retained the image of the region other than the object region. Other than these, the output control section 270 controls the output section 290 to output the image of the region other than the object region retained in the image retaining section 214, if a difference between the image content of the region other than the object region in the motion image of the monitor region after the image retaining section 214 retained the image of the region other than the object region and the image content of the region other than the object region retained in the image retaining section 214 is larger than a predetermined value. Other than these, the output control section 270 controls the output section 290 to output the image of the region other than the object region retained in the image retaining section 214, if it is judged that a time of a time width longer than a predetermined time width has elapsed after the image retaining section 214 retained the image of the region other than the object region. In addition, when the matching judging section 230 has judged that there does not exist any object that matches the condition in the motion image of the monitor region after the image retaining section 214 retained the image of the region other than the object region, the output control section 270 may cause the output section 290 to output the image of the region other than the object region retained in the image retaining section 214.

Note that the matching judging section 230 may judge that a plurality of objects that match the condition exist. Then if the matching judging section 230 has judged that a plurality of objects that match the condition exist, the object region identifying section 212 identifies a plurality of object regions including the plurality of objects that match the condition respectively. The output section 290 may output an image of an object region that includes an object having a higher priority predetermined according to an object feature type, if the matching judging section 230 has judged that a plurality of objects that match the condition exist. Note that the image retaining section 214 may retain an image of an object region not having been outputted from the output section 290 and the image of the region other than the object region, if the matching judging section 230 has judged that a plurality of objects that match the condition exist. Furthermore the output control section 270 controls the output section 290 to output the image retained in the image retaining section 214 if it is judged that the image retained in the image retaining section 214 is to be transmitted, after the image retaining section 214 retained the image of the region other than the object region.

Note that the output section 290 outputs, as a priority the image of the object region that includes the object having a higher priority predetermined according to an object feature type, so as to reduce, down to a predetermined data amount or less, an data amount of an image of the object region to be outputted. In addition, the output control section 270 controls the output section 290 to output the image of the object region retained in the image retaining section 214 prior to the image of the region other than the object region, if it is judged that the image retained in the image retaining section 214 is to be transmitted, after the image retaining section 214 retained the image of the region other than the object region.

Then image generating section 280 generates an object region image being an image of an object region of an image quality different according to an object type, for each object feature type that matches the condition. Then the output section 290 outputs, as a priority, an object region image of a higher image quality generated by the image generating section, if the matching judging section 230 has judged that a plurality of objects that match the condition exist. The image retaining section 214 retains an image of an object region not having been outputted from the output section 290 and the image of the region other than the object region, if the matching judging section 230 has judged that a plurality of objects that match the condition exist. In addition, the output control section 270 controls the output section 290 to output the image retained in the image retaining section 214 if it is judged that the image retained in the image retaining section 214 is to be transmitted, after the image retaining section 214 retained the image of the region other than the object region.

Note that the image generating section 280 generates an object region image being an image of an object region of a resolution different according to an object type, for each object feature type that matches the condition, and generates a differential image between a high resolution object region image and a low resolution object region image having been generated. Then the output section 290 may output an object region image of a lower resolution generated by the image generating section prior to the differential image, if the matching judging section 230 has judged that a plurality of objects that match the condition exist. In addition, the image retaining section 214 may retain the differential image not having been outputted from the output section 290 and the image of the region other than the object region, if the matching judging section 230 has judged that a plurality of objects that match the condition exist. In addition, the output control section 270 may control the output section 290 to output the image retained in the image retaining section 214 if it is judged that the image retained in the image retaining section 214 is to be transmitted, after the image retaining section 214 retained the image of the region other than the object region.

Note that the output section 290 may output the image of the object region with a higher image quality for a larger data amount obtained by the permissible data amount obtaining section 250, if the matching judging section 230 has judged that there exists an object that matches the condition. In addition, the object region identifying section 212 may identify a larger object region that includes the object that matches the condition for a larger data amount obtained by the permissible data amount obtaining section 250, if the matching judging section 230 has judged that there exists an object that matches the condition.

In addition, when the matching judging section 230 has judged that there does not exist any object that matches the condition in the motion image of the monitor region after the image retaining section 214 retained the image of the region other than the object region, the output control section 270 causes the output section 290 to output the image of the region other than the object region retained in the image retaining section 214, on condition that the data amount obtained by the permissible data amount obtaining section 250 is larger than a predetermined value.

In addition, when the matching judging section 230 has judged that there does not exist any object that matches the condition in the motion image of the monitor region after the image retaining section 214 retained the image of the region other than the object region, the output control section 270 may cause the output section 290 to output the image of the region other than the object region retained in the image retaining section 214, with an image quality that is in accordance with the data amount obtained by the permissible data amount obtaining section 250.

The object region identifying section 212 may identify a region that includes the object whose object motion amount throughout the plurality of motion image constituting images included in the motion image captured by the image capturing section 200 is the lower limit value of the motion amount stored in the condition storing section 240 or more, as an object region.

Note that the condition storing section 240 may store the lower limit value of the matching level with the predetermined object to be owned by the object to be extracted from the motion image. The object region identifying section 212 may extract a region that includes a matching object with a matching level that is the lower limit value of the matching level stored in the condition storing section 240 or more, as an object region. In addition, the condition storing section 240 may store the lower limit value of the area occupied by the color included in a predetermined color range to be owned by the object to be extracted from the motion image. The object region identifying section 212 extracts the region that includes an object whose area occupied by the color included in the predetermined color range is the lower limit value of the area stored in the condition storing section 240 or more, as an object region.

Note that each image capturing apparatus 100 may not be necessarily provided with one change amount calculating section 221 and one condition designating section 242. Alternatively, the monitoring system 110 may be provided with one change amount calculating section 221 and one condition designating section 242. Then the change amount calculating section 221 may calculate the change amount for motion images captured by a plurality of image capturing sections 200 from a predetermined reference image, for each motion image captured by the plurality of image capturing sections 200. The output control section 270 may convert a motion image whose change amount calculated by the change amount calculating section 221 is smaller than the predetermined lower limit value of the change amount, into a motion image whose data amount is smaller than in the case where the change amount calculated by the change amount calculating section 221 is the lower limit value or more, and transmit the resulting motion image to the transmission path 140. Then the condition designating section 242 may increase the lower limit value stored in the condition storing section 240 when the difference between the data amount transmittable per unit time by the transmission path 140 and the data amount outputted per unit time by the plurality of image capturing sections 200 respectively is smaller. In addition, the matching level calculating section 232 may calculate the matching level between the object included in the motion images captured by the plurality of image capturing sections 200 and the predetermined reference object, for each motion image captured by the plurality of image capturing sections 200. The output control section 270 converts a motion image whose matching level calculated by the matching level calculating section 232 is smaller than the predetermined lower limit value of the matching level into a motion image whose data amount is smaller than in the case where the matching level calculated by the matching level calculating section 232 is the lower limit value or more, and transmits the resulting motion image to the transmission path 140. The condition designating section 242 increases the lower limit value more, when the difference between the data amount transmittable by the transmission path 140 per unit time and the data amount outputted per unit time by the plurality of image capturing sections 200 respectively is smaller.

Note that the image capturing control section 210 controls the image capturing section 200 to capture an image of a monitor region, by designating the image capturing range of the image capturing section 200 for causing the image capturing section 200 to capture a motion image that includes a motion image constituting image that includes an object and whose image width in the motion direction is larger than the image width in the direction vertical to the motion direction. Then the output section 290 outputs a motion image captured by the image capturing section 200 in the state where the image capturing range is designated by the image capturing control section 210. During this operation, the image capturing control section 210 may adjust an image capturing condition of the image capturing section 200 with respect to a subject included in a image capturing range in which a motion image constituting image that includes an object and whose image width in the motion direction is larger than the image width in the direction vertical to the motion direction. Then the output section 290 may output a motion image captured by the image capturing section 200 in the state where the image condition is adjusted by the image capturing control section 210.

In addition, the image capturing control section 210 may control the image capturing section 200 to capture an image, by designating the image capturing range of the image capturing section 200 for causing the image capturing section 200 to capture a motion image constituting image that includes an object and whose region in the motion direction with respect to the object is wider than the region in the direction opposite to the motion direction with respect to the object. In addition, the image capturing control section 210 may adjust an image capturing condition of the image capturing section 200, with respect to a subject included in the image capturing range in which a motion image constituting image that includes an object and whose region in the motion direction with respect to the object is wider than the region in the direction opposite to the motion direction with respect to the object is captured.

Note that the image capturing rate of the motion image captured by the image capturing section 200 may be higher than the monitor display rate. Also, the data amount per unit time required for transmitting the motion images captured by all the image capturing apparatuses 100 may be larger than the data amount transmittable by the transmission path 140 per unit time. Note that the frame image in the present embodiment is one example of the motion image constituting image, and the motion image constituting image includes a field image. In addition, the image capturing section 200 may capture an image of the entire monitor region using a fish eye lens.

In the above explanation, an embodiment is described in which the image capturing apparatus 100 performs image capturing and transmits the captured image to the server 170. However, it is possible to arrange so that the server 170 has the function of the image capturing apparatus 100 in another embodiment. For example, an arrangement is possible in which the image capturing apparatus 100 outputs a captured motion image of the monitor region as it is to the transmission path 140, and the server 170 controls the image quality of the motion image to be recorded, or controls the image quality of the motion image that the display apparatuses 180, 181, and 182 are to display. In such a case, the server 170 may include an object region identifying section 212, an image retaining section 214, a differential image generating section 216, an image characteristic amount extraction section 220, a matching judging section 230, a condition storing section 240, a condition designating section 242, a permissible data amount obtaining section 250, an image quality selection section 260, an image quality storing section 262, an output control section 270, an image generating section 280, and an output section 290. In such a case, the output section 290 may record a motion image generated by the output motion image generating section 282, or display the same to the display apparatuses 180, 181, and 182.

Figure 4A:
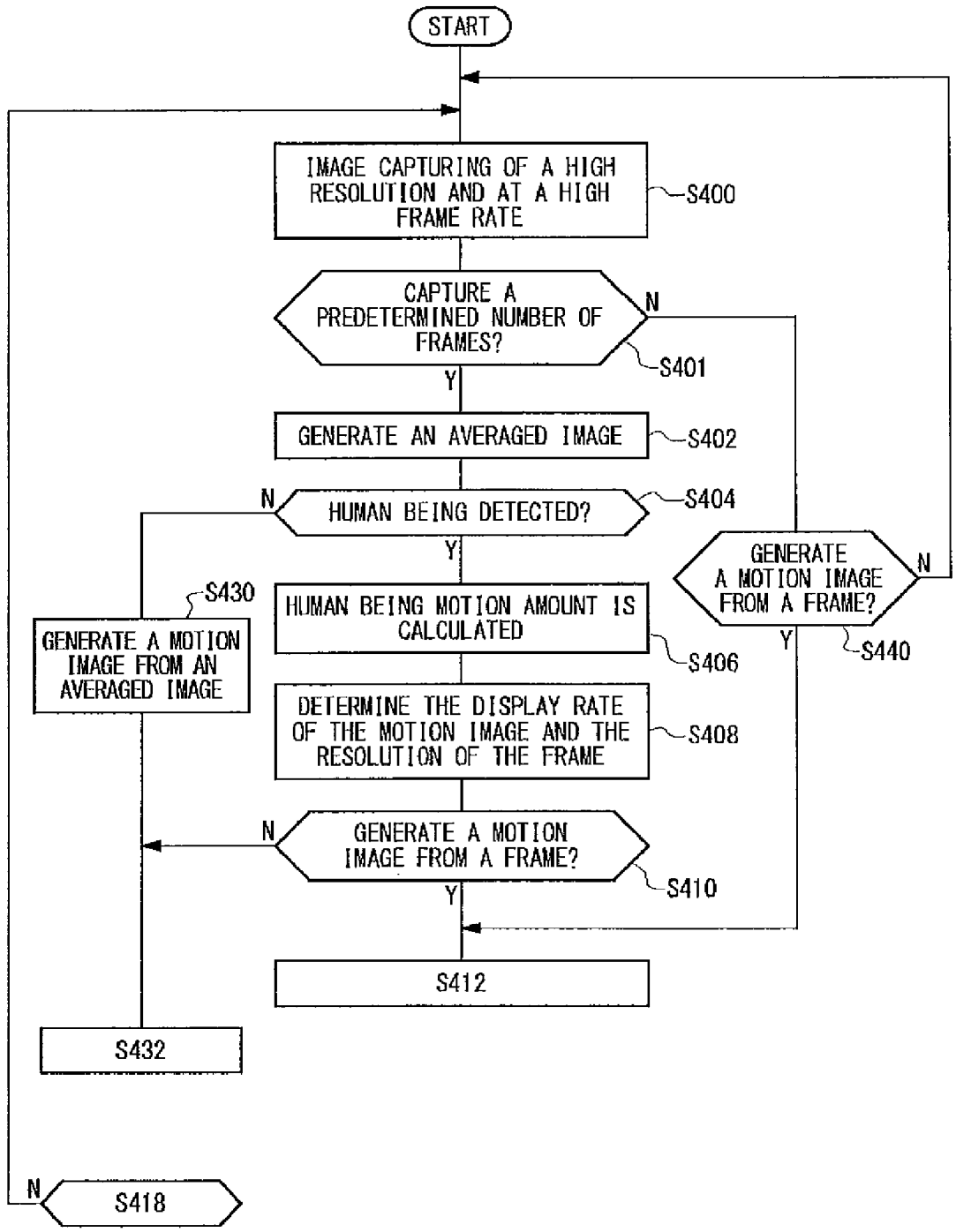
FIGS. 4A and 4B show one example of an operation flow of the image capturing apparatus 100.
Figure 4B:
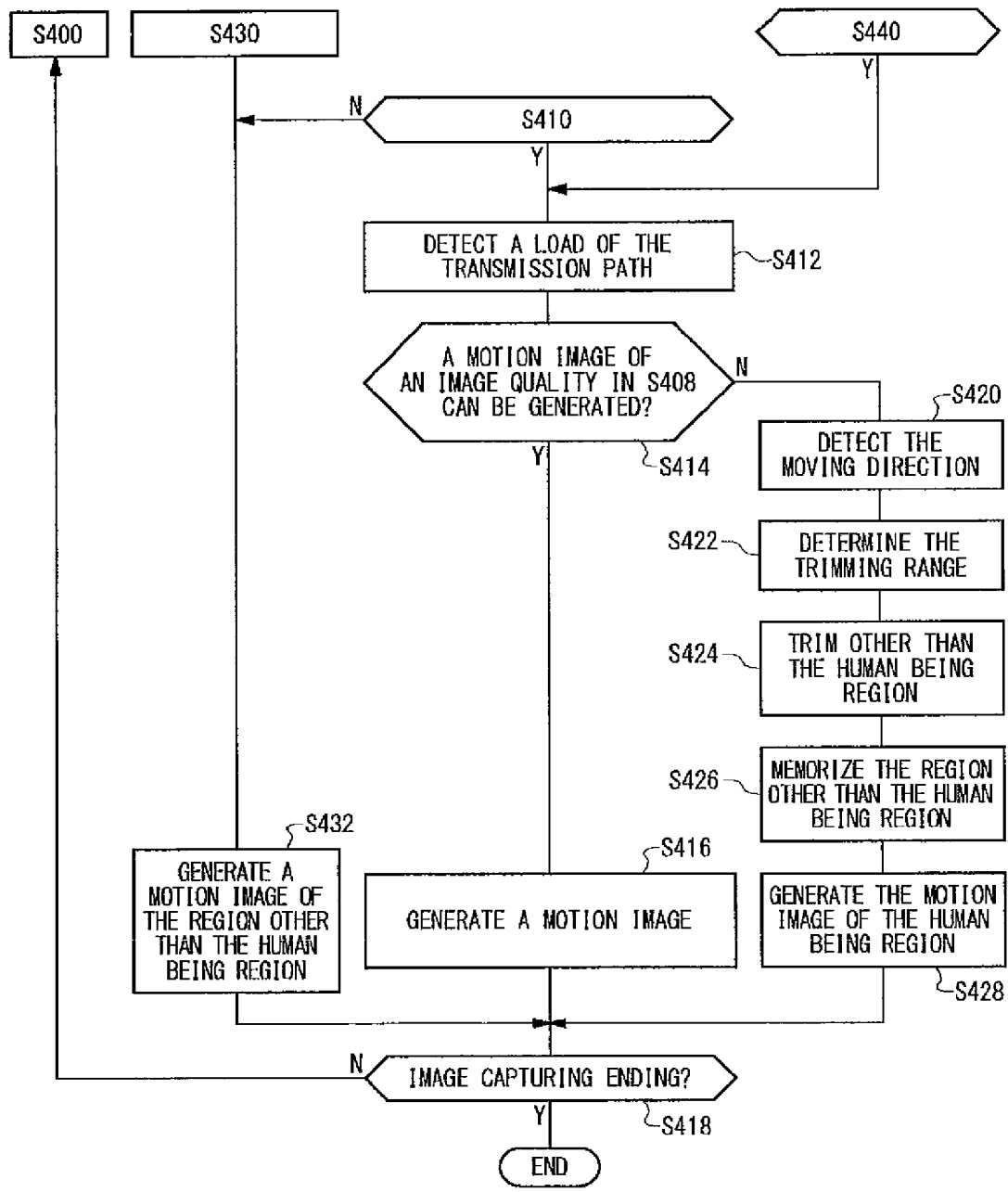

FIG. 4A and FIG. 4B show one example of an operation flow of the image capturing apparatus 100. The image capturing section 200 captures a motion image of a monitor region, by consecutive image capturing of the frame image of a resolution higher than the monitor resolution of the display apparatuses 180-182, at a rate higher than the monitor display rate of the display apparatuses 180-182 (S400). Note that the averaged image generating section 202 increments the averaged counter each time the image capturing section 200 captures a frame image. Then the averaged image generating section 202 judges whether the image capturing section 200 has captured a predetermined number of frame images, based on the value of the averaged counter (S401). In S401, if it is judged that the predetermined number of frame images have been captured, the averaged image generating section 202 generates an averaged image by averaging the predetermined number of frame images captured by the image capturing section 200 for each pixel (S402), and sets the averaged counter to 0.

Then the matching judging section 230 judges whether an object matching human being has been detected or not (S404). Concretely, the object extraction section 225 extracts the contour of the object by edge enhancement or the like from the averaged image. Then the matching level calculating section 232 calculates the form matching level of the contour of the object extracted by the object extraction section 225 and the predetermined human being pattern, by comparing the contour of the object extracted by the object extraction section 225 and the predetermined human being pattern. For example, the matching level calculating section 232 may calculate the value obtained by dividing the area of the overlapping portion between the contour of the object and the human being pattern having the same area as that of the object, by the area of the contour of the object, as the form matching level. Then the matching judging section 230 judges that an object that matches human being has been detected, if the form matching level calculated by the matching level calculating section 232 is the lower limit value or more of the form matching level stored in the condition storing section 240.

Note that the motion amount calculating section 222 calculates the moving speed of the object extracted by the object extraction section 225. Then if the matching judging section 230 has judged that an object that matches human being has been detected in S404, the image quality selection section 260 obtains the moving speed of the object that matches human being calculated by the motion amount calculating section 222 (S406).

Then the image capturing section 100 determines the display rate of the output motion image and the resolution of the frame image to be outputted to the transmission path 140 (S408). To be more specific, the image quality selection section 260 selects the resolution and the display rate stored in the image quality storing section 262 in association with the area of the object that matches human being and the speed of the moving of the object that matches human being. For example in S408, the image quality selection section 260 selects a higher resolution for a smaller sized object (the resolution should be the resolution of the frame image captured by the image capturing section 200 or less), and determines a higher display rate for an object moving faster (the display rate should be the rate at which the frame image is captured by the image capturing section 200 or less).

Then the output motion image generating section 282 judges whether to generate an output motion image that includes an output frame image generated from the frame image captured by the image capturing section 200, according to the display rate determined in S408 (S410). For example, the output motion image generating section 282 retains a counter that is incremented each time the image capturing section 200 captures a frame image, and is initialized to 0 each time a motion image is generated from the captured frame image. The output motion image generating section 282 determines whether to generate an output motion image that includes an output frame image when the product between the retained counter value and the image capturing interval of the frame image captured by the image capturing section 200 is the frame interval of the output frame image included in the output motion image indicated by the display rate determined in S408 or more.

In S410, when the output motion image generating section 282 has judged to generate an output motion image, the permissible data amount obtaining section 250 detects the data amount transmitted per unit time on the transmission path 140 (S412). Then the permissible data amount obtaining section 250 calculates the permissible data amount indicating the difference between the data amount transmittable by the transmission path 140 per unit time and the data amount transmitted by the transmission path 140 per unit time. Note that the permissible data amount obtaining section 250 may obtain the permissible data amount from the server 170.

Then the output motion image generating section 282 judges whether it is possible to generate a motion image of an image quality determined in S408 (S414). To be more specific, the output motion image generating section 282 judges that it is possible to generate a motion image of an image quality determined in S408, if the permissible data amount is the data amount that should be transmitted per unit time in order to transmit the motion image data that has the resolution and the display rate determined in S408.

Then in S414, if it is judged that a motion image of an image quality determined in S408 can be generated, the output motion image generating section 282 generates an output frame image resulting from converting the frame image to a resolution determined in S408, by thinning pixels from the frame image captured by the image capturing section 200. Then the output motion image generating section 282 generates a motion image that includes the generated output frame image, and supplies the generated motion image to the output section 290 (S416). Then the image capturing apparatus 100 judges whether an image capturing ending instruction has been received (S418). In S418, if an image capturing ending instruction has not been received, the image capturing apparatus 100 moves the processing to S400, and if an image capturing ending instruction has been received in S418, the image capturing apparatus 100 ends the processing.

Note that after the processing has been moved to S400 after the image capturing ending judgment of S418, if it is judged that a predetermined number of frame images have not yet captured in S401, the output motion image generating section 282 judges whether to generate an output motion image that includes an output frame image (S440). In S440, the output motion image generating section 282 judges whether to generate an output motion image that includes an output frame image according to the display rate already determined, just as in S410. Then the image capturing apparatus 100 moves the processing to S412 if it is judged to generate an output motion image that includes an output frame image in S440, and if it is judged not to generate an output motion image that includes an output frame image, the image capturing apparatus 100 moves the processing to S400.

In S414, when it is judged that the output motion image generating section 282 cannot generate a motion image of an image quality determined in S408, the output motion image generating section 282 obtains the moving direction of the object that matches human being (S420). To be more specific, the moving direction identified by the motion direction identifying section 223 with respect to the object matching human being is obtained as the moving direction of the object.

Then the output motion image generating section 282 determines the trimming range with respect to the frame image captured by the image capturing section 200 (S422). To be more specific, the output motion image generating section 282 determines the trimming range in which a trimming image that includes an object matching human being and whose image width in the moving direction of the object is larger than the image width in the direction vertical to the moving direction. Hereinafter, the region of the trimming range is referred to as a human being region. Then the output motion image generating section 282 generates a trimming image of the human being region by trimming the frame image in the trimming range determined in S422 (S424). Note that the trimming image may be one example of the object region image in the present invention. In addition, the image retaining section 214 memorizes the image of the trimmed-off region (i.e. an image of the region other than the human being region) (S426). Then the output motion image generating section 282 generates a motion image that includes the trimming image obtained in S424, and supplies the motion image to the output section 290 (S428). Then the image capturing apparatus 100 moves the processing to S418.

Note that in S404, if the matching judging section 230 has not detected any object matching human being, the output motion image generating section 282 generates a motion image from an averaged image and supplies the same to the output section 290 (S430). In pursuing this operation, the output motion image generating section 282 may generate a motion image that includes an output frame image whose data amount has been reduced by thinning the pixels of the averaged image as appropriate and supply the same to the output section 290, or may generate a motion image from an output frame image whose data amount has been reduced by thinning the pixels of the frame image captured by the image capturing section 200 as appropriate and supply the same to the output section 290.

Then the output control section 270 supplies a motion image that includes an image of a region other than the human being region retained in the image retaining section 214 in S426, to the output section 290 (S432). In addition, when it is judged not to generate a frame image in S410, too, the image capturing apparatus 100 moves the processing to S432, and the output control section 270 supplies a motion image that includes an image of a region other than the human being region retained by the image retaining section 214 in S426 to the output section 290. Note that in S432, the output control section 270 may cause the output section 290 to output the image itself of the region other than the human being region, instead of generating a motion image from the image of the region other than the human being region and supplying the same to the output section 290.

As described in the above, when having detected a human being motion, the image capturing apparatus 100 transmits, to the server 170, a motion image of a higher resolution and a higher display rate than in the case where no human being motion is detected. During this operation, the image capturing apparatus 100 transmits, to the server 170, a motion image including a frame image where only the region in which human being motion is detected is rendered high resolution and the other region is trimmed off when the load for the transmission path 140 is high, and transmits the trimmed-off image other than the human being region after no human being motion started to be detected. By the above arrangement, the image capturing apparatus 100 is able to eliminate the time required for motion image data to reach the server 170 even when the load of the transmission path 140 is great.

FIG. 5 shows one example of the image quality information stored in the image quality storing section 262 in a table format. The image quality storing section 262 stores a resolution PR of an output frame image included in a motion image to be outputted, and a display rate FR of the motion image to be outputted, in association with the human being area S and the human being motion speed V. For example, the image quality storing section 262 stores PR3 as the resolution of the output frame image, and FR1 as the display rate of the motion image to be outputted, if the human being area S is in a range between S1 or more and less than S2, and the human being motion speed V is less than V1.

Note that the size of the resolution PR is PR4>PR3>PR2>PR1, and the size of the display rate FR is FR4>FR3>FR2>FR1. In this way, the image quality storing section 262 stores a higher display rate FR in association with a faster motion speed, and stores a larger resolution PR in association with a smaller human being area. For this reason, the image capturing apparatus 100 is able to prevent in advance a case where the data amount of a motion image to be transmitted from becoming unnecessarily large, by reducing the resolution of the frame image in which a person is captured large. In addition, the image capturing apparatus 100 is able to increase the display rate when a faster moving person is detected, and so it becomes possible to provide a motion image by which a surveyor easily recognizes what this person is doing.

Note that in the above explanation, the image quality storing section 262 stores the resolution PR of the output frame image and the display rate FR of the motion image to be outputted, in association with the human being area S and the human being motion speed V. However, it is alternatively possible to arrange so that the image quality storing section 262 stores a resolution PR and a gray scale of an output frame image, and a display rate FR of the motion image to be outputted, in association with the human being area S and the human being motion speed V. For example, the image quality storing section 262 may store a smaller gray scale in association with a larger human being area. In addition, when a human being area is larger, the output motion image generating section 282 may generate an output motion image from an output frame image of a smaller gray scale.

In this way, the condition storing section 240 stores a condition of an object to be extracted from an image captured by the image capturing section 200. Then the object extraction section 225 extracts an object that matches the condition from the image captured by the image capturing section 200. Then the image generating section 280 converts the image captured by the image capturing section 200 into an image of a lower image quality, if the size of the object extracted by the object extraction section 225 is larger. Then the output section 290 outputs an image resulting from conversion by the image generating section 280.

For example, the condition storing section 240 stores the lower limit value of the matching level between the object to be extracted and the predetermined object. Then the object extraction section 225 extracts an object that matches the predetermined object with a higher matching level than the lower limit value stored in the condition storing section 240, from the motion image captured by the image capturing section 200. Then the image generating section 280 converts the image captured by the image capturing section 200 into an image of a lower image quality, if the size of the object extracted by the object extraction section 225 is larger.

In addition, the condition storing section 240 stores the lower limit value of the area occupied by the color included in the predetermined color range that the object to be extracted should have. Then the object extraction section 225 extracts the object whose area occupied by the color included in the predetermined color range is the lower limit value of the area stored in the condition storing section 240 or more, from the motion image captured by the image capturing section 200. Then the image generating section 280 converts the image captured by the image capturing section 200 into an image of a lower image quality if the size of the object extracted by the object extraction section 225 is larger.

To be more specific, the image generating section 280 converts the image captured by the image capturing section 200 into an image of a lower resolution, if the size of the object extracted by the object extraction section 225 is larger. In addition, the image generating section 280 converts the image captured by the image capturing section 200 into an image of a smaller gray scale, if the size of the object extracted by the object extraction section 225 is larger.

Figure 6:
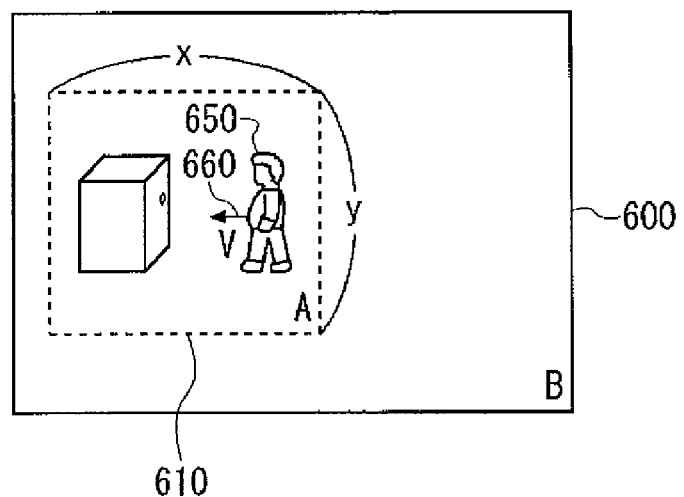
FIG. 6 shows one example of a trimming image generated by an output motion image generating section 282.

FIG. 6 shows one example of a trimming image generated by the output motion image generating section 282. The output motion image generating section 282 generates a trimming image A to be included in the motion image outputted by the output section 290, from the image 600. Note that the image 600 may be a frame image corresponding to one frame of a motion image captured by the image capturing section 200, or an averaged image generated by the averaged image generating section 202. The motion direction identifying section 223 and the motion amount calculating section 222 calculate a motion direction 660 of a person 650 and the motion speed V of the person 650 in the image 600, from the change in position of the same person 650 extracted by the object extraction section 225 from a plurality of consecutive images.

Then the output motion image generating section 282 determines the trimming frame 610 that includes the person 650 and whose image width x in the motion direction identified by the motion direction identifying section 223 is larger than the image width y in the direction vertical to the motion direction (S422 in FIG. 43). In the example in the present drawing, the output motion image generating section 282 determines a trimming frame 610 whose side in the motion direction identified by the motion direction identifying section 223 is wider than the side thereof that is in the direction opposite to the motion direction.

The output motion image generating section 282 generates a motion image where a trimming image A in the trimming frame 610 is set as an output frame image corresponding to the timing at which the image 600 has been captured, and outputs the motion image to the output section 290 (S428 in FIG. 4B). Then the image retaining section 214 memorizes the region image B outside the trimming frame 610 (S426 in FIG. 4B). Then the output section 290 transmits the region image B memorized in the image retaining section 214 at the timing when the transmission data amount of the motion image data outputted by the output section 290 is larger than the permissible data amount (S432 in FIG. 4B).

In this way, the image generating section 280 generates a motion image constituting image that includes an object and whose region in the motion direction with respect to the object is wider than the region thereof in the direction opposite to the motion direction with respect to the object, by trimming the motion image constituting image included in the motion image captured by the image capturing section 200. For this reason, the image capturing apparatus 100 is able to transmit, to the server 170, not only the person 650 but also an image trimmed to include the image region of the moving destination of the person 650. According to this, the image capturing apparatus 100 is able to provide a motion image in which a monitor target subject of interest to the surveyor is shown, while eliminating the data amount to be transmitted in comparison to the case where the entire captured region image is transmitted. For this reason, the image capturing apparatus 100 is able to swiftly provide the server 170 with a motion image having the content enabling the surveyor to sufficiently monitor the person 650, even when there is a jam and no sufficient space left in the transmission path 140 for transmitting the motion image of the entire image.

Figure 7:
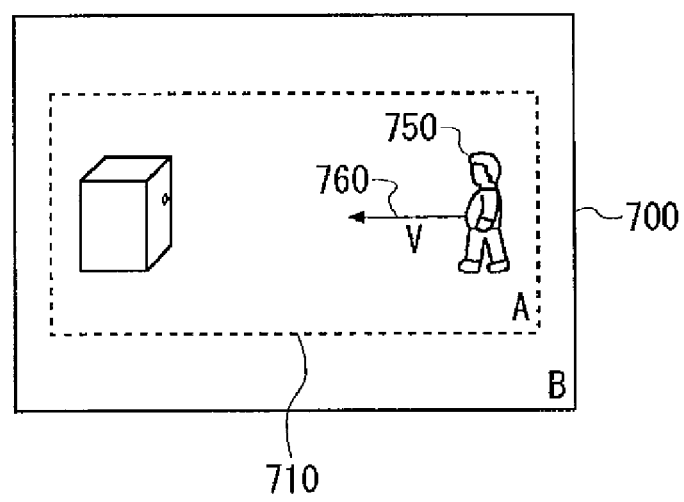
FIG. 7 shows another example of a trimming image.

FIG. 7 shows another example of the trimming image generated by the output motion image generating section 282. In the example in this drawing, the motion amount calculating section 222 calculates the motion speed larger than in the case of FIG. 6. During this operation, the output motion image generating section 282 sets the trimming frame 710 so as to obtain a trimming image A whose image width in the direction 760 identified by the motion direction identifying section 223 is larger. For this reason, the image capturing apparatus 100 is able to provide the server 170 with a monitor image from which the surveyor is able to adequately determine the action intent of the person, even when the motion of the person is fast.

Figure 8:
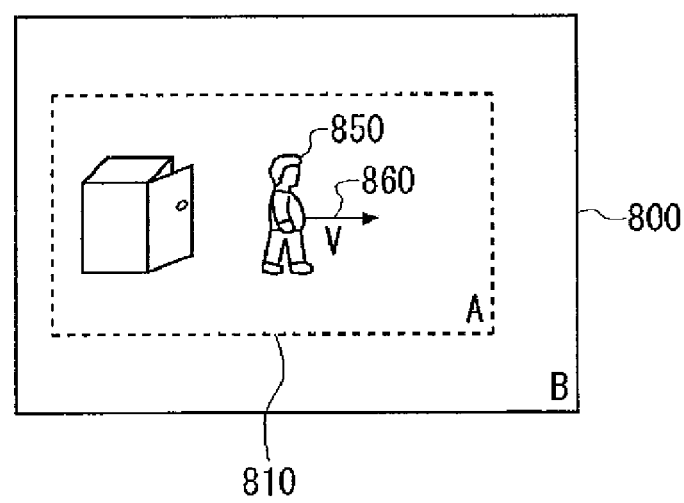
FIG. 8 shows a still different example of a trimming image.

FIG. 8 shows a further different example of the trimming image generated by the output motion image generating section 282. In the example in this drawing, the output motion image generating section 282 determines the trimming frame 810 where the person 850 is positioned in the substantial center thereof. In this way, the image generating section 280 generates a motion image constituting image that includes an object extracted by the object extraction section 225 and whose region in the motion direction with respect to the object is wider than the region in the direction opposite to the motion direction with respect to the object by means of trimming from the motion image constituting image included in the motion image captured by the image capturing section 200. That is, the output motion image generating section 282 determines the trimming frame 810 capable of obtaining the trimming image A whose region in the motion direction of the person 850 is substantially the same as the region in the direction opposite to the motion direction. By arranging in the above way, the image capturing apparatus 100 is able to provide the server 170 with an image from which the surveyor is able to adequately monitor the regions located before and after the person 850.

Note that the example regarding FIG. 6-FIG. 8 has dealt with examples in which trimming is performed to a frame image captured by the image capturing apparatus 100 or to an averaged image. However alternatively, the image capturing control section 210 may cause the image capturing section 200 to perform image capturing by causing the image capturing condition to match the subject within the trimming frames 610, 710, and 810, instead of performing trimming using the trimming frames 610, 710, and 810. For example, the image capturing control section 210 may control the image capturing direction and the zoom value of the image capturing section 200, so as to set the range of the trimming frames 610, 710, and 810 to be the image capturing range of the image capturing section 200.

Figure 9:
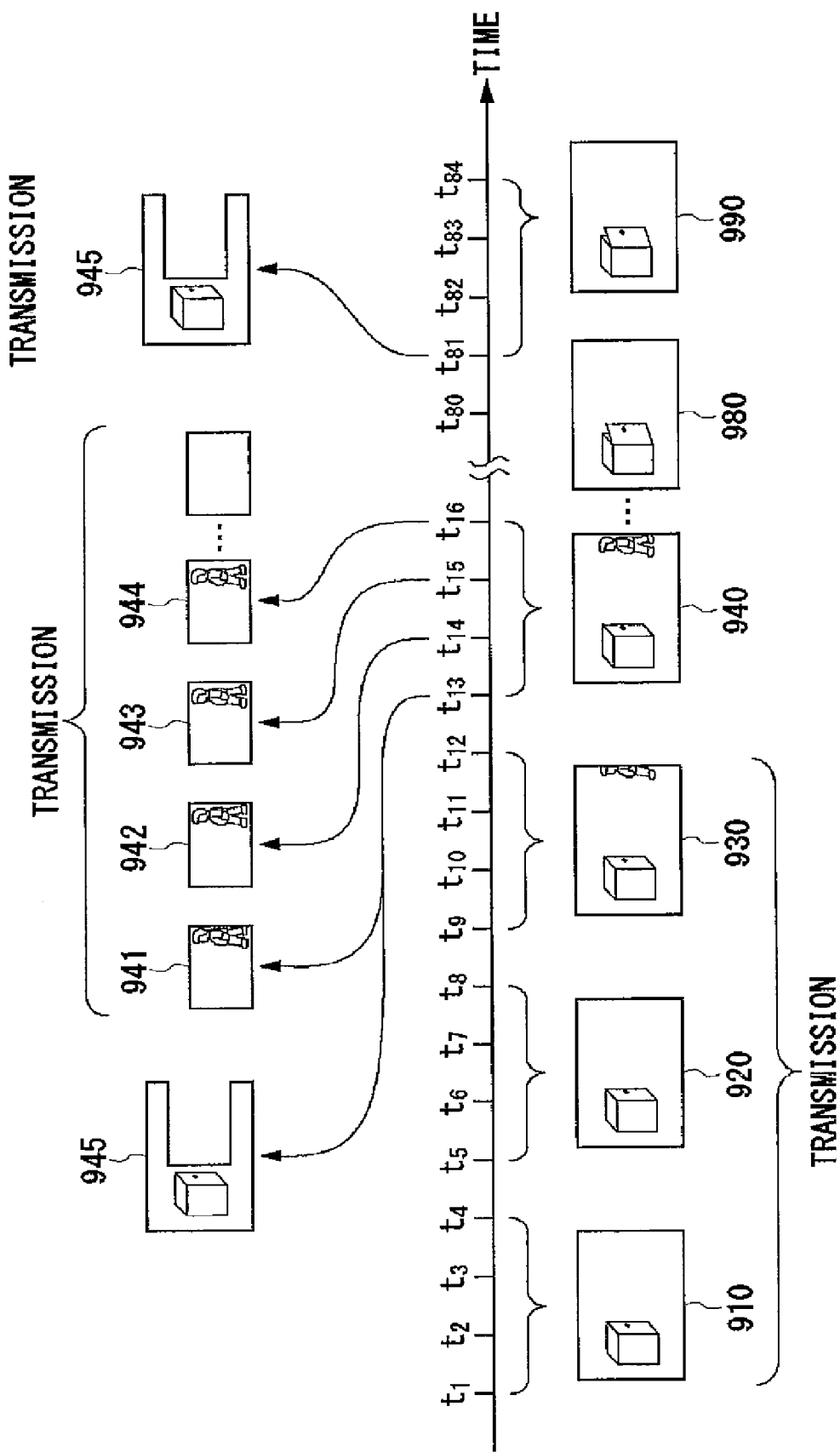
FIG. 9 chronologically shows one example of a frame image outputted by an output section 290.

FIG. 9 chronologically shows one example of the frame image included in the motion image outputted by the output section 290. The averaged image generating section 202 generates averaged images 910, 920, 930, 940, . . . , 980, 990, . . . , by averaging the four frame images consecutively captured by the image capturing section 200. Then when there is not change between the consecutive averaged images, the output motion image generating section 282 supplies a motion image by which an output frame image is displayed in a display interval being a predetermined number of times (e.g. 4 times) of the image capturing interval of the image capturing section 200, to the output section 290. For example, the output motion image generating section 282 supplies the motion image in which averaged images (910, 920, 930) resulting from averaging a predetermined number of consecutive frame images are the output frame images, to the output section 290. Note that the output motion image generating section 282 may supply a motion image where images resulting from thinning the pixels of the averaged images are set as the output frame images, to the output section 290, or supply a motion image that includes a differential image generated by the differential image generating section 216 from the consecutive averaged images, to the output section 290.

Then such as at the time t12 and the time t16 when there is a change detected between consecutive averaged images (e.g. averaged images 920 and 930, and averaged images 930 and 940) and the matching judging section 230 has judged that there is an object that matches a human being motion within the averaged images (e.g. averaged images 930, 940), the output motion image generating section 282 supplies, to the output section 290, a motion image that includes a frame image captured by the image capturing section 200 after the time t12.

During this operation, as explained in S420-S428 in FIG. 4B, the output motion image generating section 282 may supply, to the output section 290, a motion image where the trimming image 941 resulting from trimming using the trimming frame explained with reference to FIG. 6-FIG. 8 is set as an output frame image. Then the image retaining section 214 retains the image 945 corresponding to the trimmed-off portion. Then the output motion image generating section 282 generates a motion image including output frame images having an image capturing interval captured by the image capturing section 200 and supplies the same to the output section 290, until the time t80 at which no human being motion started to be detected. Although not shown in the drawings for the convenience of drafting, it is needless to say that the image retaining section 214 may retain the image corresponding to the trimmed-off portion from the time t14 to the time t80.

Then as in the averaged images 980 and 990 where no change between consecutive averaged images started to be detected, the output motion image generating section 282 supplies a motion image where an averaged image corresponds to one frame of output frame image, to the output section 290. During this operation, the output control section 270 controls the output section 290 to output an image 945 retained by the image retaining section 214. Note that the output control section 270 may divide the image 945 into a plurality of regions so that the data amount outputted per unit time by the output section 290 is the permissible data amount obtained by the permissible data amount obtaining section 250 or less, and sequentially output the images of the plurality of regions resulting from the division, to the output section 290.

Note that the image retaining section 214 may retain the entire frame images captured by the image capturing section 200 from the time t13 to the time t80, and causes the output section 290 to output the motion image where the frame image retained by the image retaining section 214 is set as one frame of output frame image at or after the time t81 when no change starts to be detected. During this operation, the output control section 270 may determine the size, the resolution, or the gray scale of the image to be transmitted by the output section 290, so that the summation of the data amount per unit time outputted by the output section 290 is the permissible data amount obtained by the permissible data amount obtaining section 250 or less. Note that the output control section 270 controls the output section 290 to output the frame image (or the image 945) retained by the image retaining section 214, by adding thereto the timing information showing at which timing the image was captured.

In this way, the averaged image generating section 202 averages a plurality of motion image constituting images included in a motion image captured by the image capturing section 200 during a period of a predetermined time width, and generates an averaged image for each predetermined time width. Then when the matching judging section 230 has judged that first averaged images generated by the averaged image generating section 202 by averaging a plurality of motion image constituting images included in the motion images captured by the image capturing section 200 during a first time period do not match the condition, the output motion image generating section 282 sets the first averaged images as the motion image constituting images of the output motion images during the first time period, and when the matching judging section 230 has judged that the first averaged images match the condition, the output motion image generating section 282 sets the motion images captured by the image capturing section 200 during the first time period, as the output motion images of the first time period.

In addition, the averaged image generating section 202 may average the plurality of motion image constituting images included in the motion images captured by the image capturing section 200 during a time period of a predetermined time width, and generate an averaged image for each predetermined time width. Then when the matching judging section 230 has judged that the first averaged images generated by the averaged image generating section 202 by averaging the plurality of motion image constituting images included in the motion images captured by the image capturing section 200 during the first time period do not match the condition, the output motion image generating section 282 may set the averaged images generated by the averaged generating section by averaging the plurality of motion image constituting images captured by the image capturing section 200 during a second time period subsequent to the first time period, as the motion image constituting images of the output motion images of the second period, and when the matching judging section 230 has judged that the first averaged images match the condition, the output motion image generating section 282 may set the motion images captured by the image capturing section 200 during the second time period as the output motion images of the second time period.

Note that the averaged image generating section 202 may determine the time width during which a plurality of motion image constituting images are captured for use in generating one averaged image, so that the display rate of the motion image represented by the plurality of averaged images is lower than the display rate of the motion image transmittable by the data amount obtained by the permissible data amount obtaining section 250, average the plurality of motion image constituting images included in the motion images captured by the image capturing section 200 during the time period of the time width, and generate an averaged image for each time width.

Note that in the above-mentioned examples, the output control section 270 controls the output section 290 to output the image 945 when no change starts to be detected. In a different example, the output control section 270 may control the output section 290 to output the image 945 on condition that a predetermined time has elapsed after the image retaining section 214 retained the image. In addition, it is possible to transmit the image 945 on condition that the storage capacity further storable by the image retaining section 214 becomes smaller than a predetermined value. Other than these, the output control section 270 may transmit the image 945 on condition that a change exceeding a predetermined value has occurred in a region of the image 945 in the motion image.

Note that when the image 945 is transmitted in the above way, it is possible to exceed the permissible data amount being the data amount obtained from the permissible data amount obtaining section 250. In such a case, the output motion image generating section 282 may reduce the data amount summation for the trimming images 941-944 and the image 945, so as to reduce the transmission data amount transmitted per unit time when the image 945 and the trimming image 941 are transmitted from the output section 290. For example, the output motion image generating section 282 may reduce the data amount summation by raising the compression rate or by reducing the image quality. The output control section 270 may ensure the band required for transmitting the image 945 in this manner. Note that the output control section 270 may transmit the image 945 on condition that the data amount transmitted from the output section 290 has become smaller than the permissible data amount. Note that the output motion image generating section 282 may adjust the image quality of the image 945 or the compression rate used in compressing the image 945, so as to reduce the transmission data amount down to the permissible data amount or less.

Figure 10:
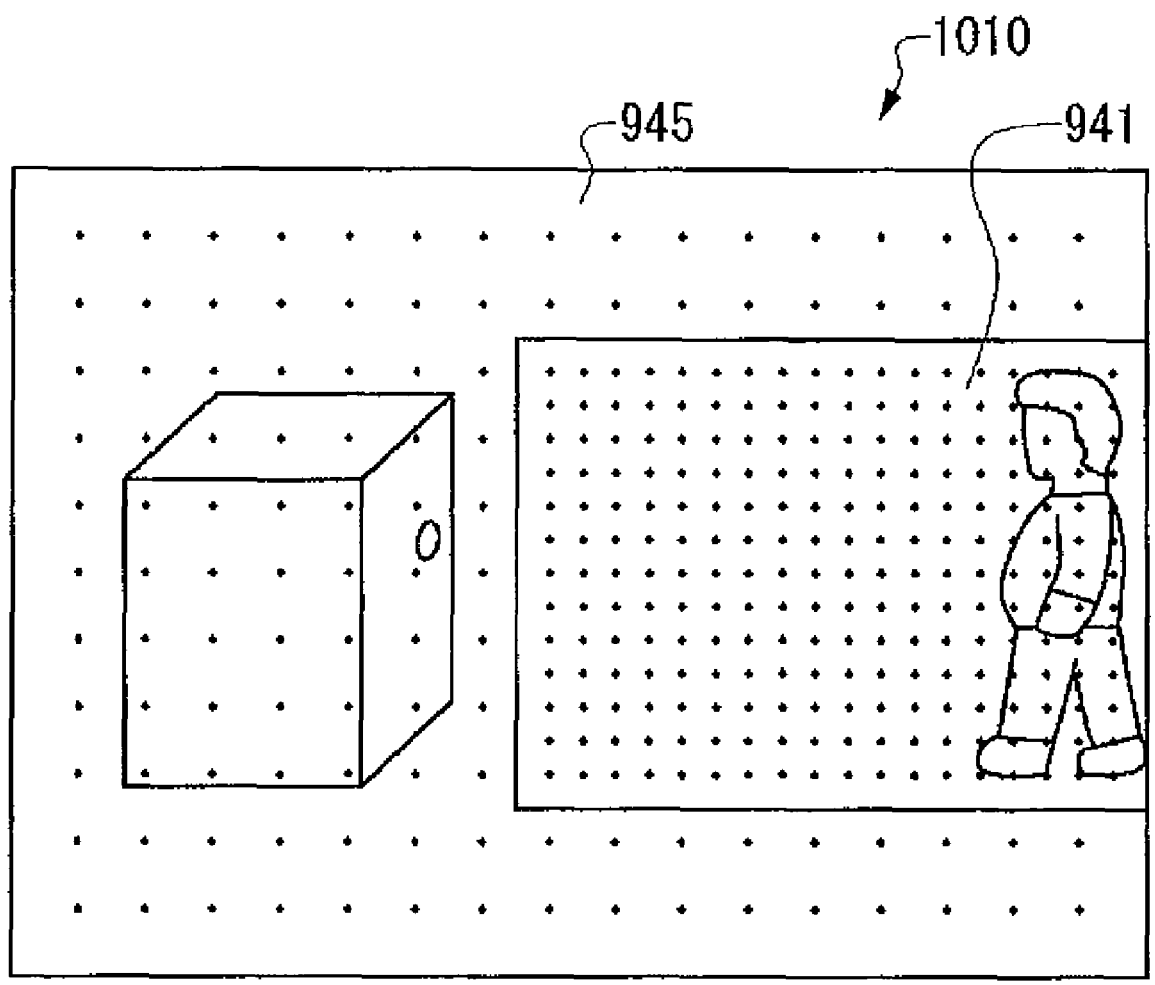
FIG. 10 shows one example of an output frame image generated by the output motion image generating section 282.

FIG. 10 shows one example of the output frame image generated by the output motion image generating section 282. This drawing shows another example of the output frame image generated by the output motion image generating section 282 from the frame image captured by the image capturing section 200 at the time t13 in FIG. 9. In the example of FIG. 9, the output motion image generating section 282 generates a motion image where the trimming image including the human being including region within the frame image captured by the image capturing section 200 is set as an output frame image, and causes the output section 290 to output the generated motion image. However in the example in the present drawing, the output motion image generating section 282 generates a motion image including an output frame image 1010 whose resolution of the human being including region is higher than the resolution of the region other than the human being including region, and causes the output section 290 to output the generated motion image.

The output motion image generating section 282 generates the output frame image 1010 by thinning more pixels from the region other than the human being including region, than from the human being including region, in the frame image captured by the image capturing section 200. Note that the output motion image generating section 282 may cause the output section 290 to perform the outputting by including resolution information indicating respective resolutions of the plurality of regions in the output frame image 1010. In addition, the image retaining section 214 may retain the image represented by the pixels thinned by the output motion image generating section 282, and the output control section 270 may cause the output section 290 to output the image retained by the image retaining section 214 at or after the time t81.

As described in the above, the image capturing section 200 captures a motion image of a data amount larger than that of the motion image data of the number of pixels, the gray scale, and the display rate displayable by the display apparatuses 180-182. In addition, the image capturing section 200 captures a motion image of a data amount larger than the data amount for one image capturing apparatus 100 transmittable by the transmission path 140 per unit time. Then the output motion image generating section 282 and the output control section 270 decrease the data amount outputted by the output section 290 per unit time, by controlling the image quality of the motion image caused to be outputted by the output section 290 (e.g. the resolution, the gray scale, and the display rate).

Figure 11:
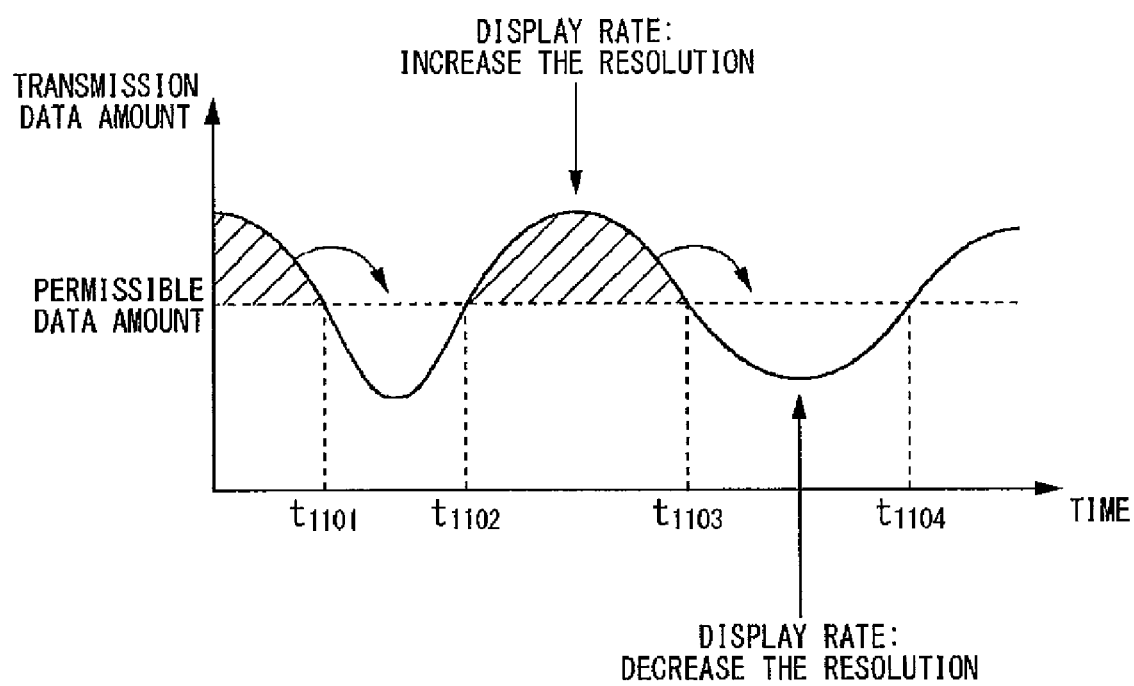
FIG. 11 shows one example of a chronological development of the data amount outputted from the output section 290 to a transmission path 140.

FIG. 11 shows one example of the chronological development of the data amount to be outputted to the transmission path 140 by the output section 290. The permissible data amount obtaining section 250 obtains the data amount for one image capturing apparatus 100 transmittable by the transmission path 140 per unit time as the permissible data amount being the data amount permitted by the transmission path 140 per unit time. As explained from FIG. 1 to FIG. 10, the output motion image generating section 282 and the output control section 270 control the data amount outputted by the output section 290 per unit time not to exceed the permissible data amount, by controlling the resolution, the gray scale, and the display rate of the motion image caused to be outputted by the output section 290.

For example, when the output motion image generating section 282 attempts to transmit a motion image whose display rate or resolution is high, which has been captured by the image capturing section 200 in response to detection of a human being motion or the like, the data amount outputted by the output section 290 per unit time exceeds the permissible data amount such as in the period from the time t1102 to the time t1103. In such a case, the output motion image generating section 282 generates a motion image of a low data amount, by generating a motion image of a human being including portion by trimming the frame image captured by the image capturing section 200, or by thinning the frame image according to the human being motion speed as appropriate, for reducing the data amount outputted by the output section 290 per unit time down to the permissible data amount. Then the output control section 270 causes the output section 290 to output the trimmed-off image or the image represented by the thinned-off pixels during the time period between the time t1102 and the time t1103, in a time period where the data amount outputted per unit time becomes smaller than the permissible data amount (e.g. the time period between the time t1103 and the time t1104). According to such control, the image capturing apparatus 100 is able to transmit the motion image of the data amount substantially the same as the permissible data amount, to the server 170. For this reason, according to the monitoring system 110, it becomes possible to effectively use the band width of the transmission path 140.

FIG. 12 shows one example of the condition stored in the condition storing section 240. The condition storing section 240 stores the lower limit values (S1, V1, Sα, Sβ, sγ, md) respectively for the human being area, the motion speed of the object, the area of the change region, the area of the peculiar color, the form matching level with the reference object, and the matching level of the moving direction with the reference direction. The matching judging section 230 judges that the averaged image generated by the averaged image generating section 202 matches the condition stored in the condition storing section 240, if the object is detected which has the human being area, the motion speed of the object, the area of the change region, the area of the peculiar color, the form matching with the reference object, and the matching level of the moving direction with the reference direction which are the lower limit values stored in the condition storing section 240 or more. During this operation, as explained with reference to FIG. 1-FIG. 11, the output motion image generating section 282 generates a motion image of a higher image quality than in the case where the matching judging section 230 has judged that it does not match the condition stored in the condition storing section 240, from the motion image captured by the image capturing section 200.

Note that the condition storing section 240 may store the lower limit value of the number of pixels having the pixel value having changed by a predetermined value or more, between a plurality of frame images captured by the image capturing section 200 and a plurality of averaged images generated by the averaged image generating section 202, as the lower limit value of the area of the change region. In addition, the condition storing section 240 may store the lower limit value of the ratio of the number of pixels having the pixel value having changed by a predetermined value or more, with respect to the entire number of pixels of the plurality of frame images or the plurality of averaged images, as the lower limit value of the area of the change region. Note that the pixel value may be an intensity value.

In addition, the condition storing section 240 may store the lower limit value of the number of pixels having the color included in the predetermined color range included in a plurality of frame images or a plurality of averaged images, as the lower limit value of the area of the peculiar color. In addition, the condition storing section 240 may store the lower limit value of the ratio of the number of pixels including the color included in the predetermined color range with respect to the entire number of pixels of the frame images or the averaged images, as the lower limit value of the area of the peculiar color.

In addition, the condition storing section 240 may store the lower limit value of the area of the portion of the contour of the object included in the frame images or the averaged images that overlaps with the predetermined reference object having the same area, as the lower limit value of the form matching level with the reference object. In addition, the condition storing section 240 may store the lower limit value of the ratio of the area of the portion of the contour of the object included in the frame images or the averaged images that overlaps with the predetermined reference object having the same area with respect to the area of the object, as the lower limit value of the form matching level with the reference object.

In addition, the condition storing section 240 may store the lower limit value of the index value that is inversely proportional to the angle formed between the motion direction of the object included in the frame images or the averaged images and a predetermined reference direction, as the lower limit value of the matching level between the reference direction and the moving direction. Note that the reference direction may be a predetermined direction on a frame image or an averaged image, or may be a predetermined direction in a real space. Note that the condition storing section 240 may store the lower limit value of the index value inversely proportional to the angle formed between a direction in which the subject indicated by the object included in the frame image or the averaged image moves and the direction from the position of the subject toward the image capturing section 200, as the lower limit value of the matching level between the reference direction and the moving direction.

Figure 13:
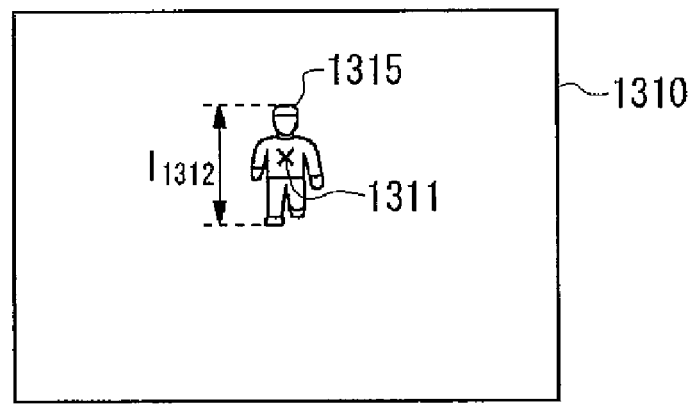
FIG. 13 shows one example of a frame image resulting from capturing the image of a subject moving toward an image capturing section 200.
Figure 13:
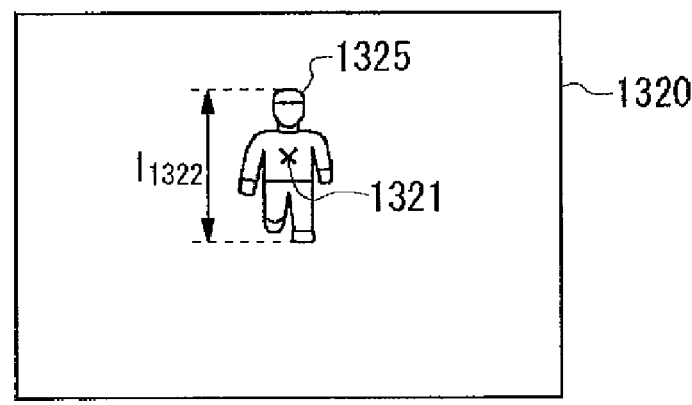
Figure 13:
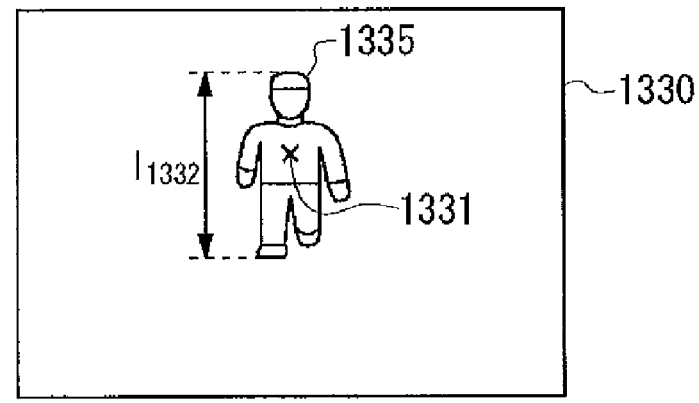

FIG. 13 shows one example of the frame images 1310, 1320, and 1330, from which the subject moving toward the image capturing section 200 is captured. The motion direction identifying section 223 calculates the barycenter positions 1311, 1321, and 1331 of the objects 1315, 1325, and 1335, extracted by the object extraction section 225 respectively from the frame images 1310, 1320, and 1330 captured by the image capturing section 200. In addition, the motion direction identifying section 223 calculates the lengths 11312, 11322, and 11332 of the objects extracted by the object extraction section 225 respectively from the frame images 1310, 1320, and 1330.

Then the motion direction identifying section 223 calculates the increase rate of the object length for the frame images 1310, 1320, and 1330 and the change rate of the barycenter position of the object, and judges that the subject indicated by the object is moving toward the image capturing section 200, if the calculated increase rate of the object length is smaller than the predetermined reference value.

Note that the condition storing section 240 may store the condition indicating the direction that the barycenter of the object moves toward the center of the image. Then the matching judging section 230 judges to match the condition stored in the condition storing section 240, if the moving direction of the barycenter position indicates the direction moving toward the center of the image. Note that the condition storing section 240 may store the condition indicating the change in size of the object, besides the condition indicating the direction that the barycenter of the object moves toward the center of the image. For example, the condition storing section 240 may store the condition indicating that the increase speed of the object length is larger than the predetermined increase speed and that the barcenter of the object is moving toward the center of the image, or that the barycenter of the object is in the vicinity of the center of the image through the plurality of motion image constituting images or averaged images.

In this way, the image capturing apparatus 100 is able to enhance the image quality of a motion image to be outputted when the subject moving toward the image capturing section 200 is detected. For this reason, by providing an image capturing section 200 for an item to be protected from thief, it is possible to adequately monitor a person approaching the item. In addition, the image capturing apparatus 100 is able to adequately monitor a person attempting to interfere with the image capturing section 200 by for example covering the image capturing section 200 with a cloth.

Figure 14:
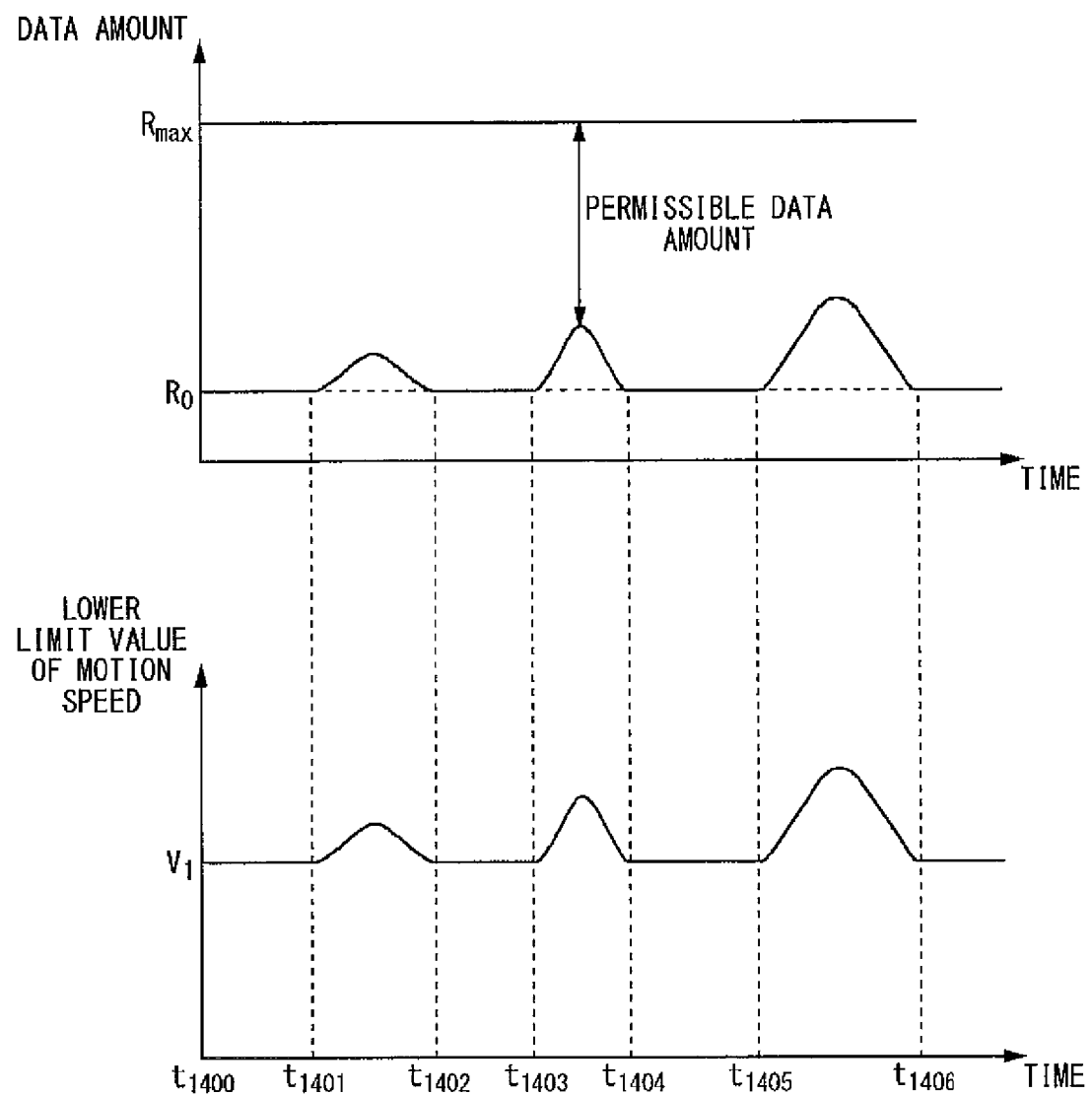
FIG. 14 shows one example of a chronological development of a lower limit value of a motion speed designated by a condition designating section 242.

FIG. 14 shows one example of the chronological development of the lower limit value of the motion speed designated by the condition designating section 242. The transmission path 140 is transmitting a motion image of a substantially constant data amount, during a time period t1400-t1401, a time period t1402-t1403, and a time period t1404-t1405. During these time periods, none of the image capturing apparatuses 100 detects a human being motion, and all the image capturing apparatuses 100 are outputting a motion image having a summation R0 of the data amount, by converting the captured motion image to a motion image of a lower image quality and outputting the motion image after conversion.

On the other hand, at least one of the image capturing apparatuses 100 is detecting a human being motion during a time period t1401-t1402, a time period t1403-t1404, and a time period t1405-t1406, and the data transmitted by the transmission path 140 per unit time increases by outputting of the captured motion image as it is to the transmission path 140 without being converted to a motion image of a low image quality. During this operation, the permissible data amount obtaining section 250 obtains a difference between the maximum data amount Rmax transmittable by the transmission path 140 per unit time and the data amount transmitted per unit time by the transmission path 140, as the permissible data amount permitted per unit time. Note that the permissible data amount obtaining section 250 may obtain the value resulting by dividing the difference between the maximum data amount Rmax transmittable by the transmission path 140 per unit time and the data amount transmitted per unit time by the transmission path 140, by the number of image capturing apparatuses 100 outputting a motion image to the transmission path 140, as the permissible data amount.

Then the condition designating section 242 causes the condition storing section 240 to store the lower limit value of the motion speed inversely proportional to the permissible data amount obtained by the permissible data amount obtaining section 250. According to this, the condition storing section 240 stores the lower limit value of faster motion speed for a smaller permissible data amount.

Note that it is possible to predetermine a priority order for the image capturing apparatuses 100. The condition designating section 242 may cause the condition storing section 240 to store the lower limit value of a slower motion speed when a higher priority order is defined for an image capturing apparatus 100. In addition, the condition designating section 242 may cause the condition storing section 240 to store the lower limit value of the motion speed that is in accordance with the permissible data amount for each predetermined time period in the predetermined order.

The above explanation has dealt with a case where the lower limit value of the motion speed stored in the condition storing section 240 is designated by the condition designating section 242 in accordance with the permissible data amount. However it is needless to say that the condition designating section 242 is able to designate, in the similar manner, the lower limit values respectively for the human being area, the area of the change region, the area of the peculiar color, the form matching level with the reference object, and the matching level of the moving direction with the reference direction, which are stored in the condition storing section 240, in accordance with the permissible data amount.

Figure 15:
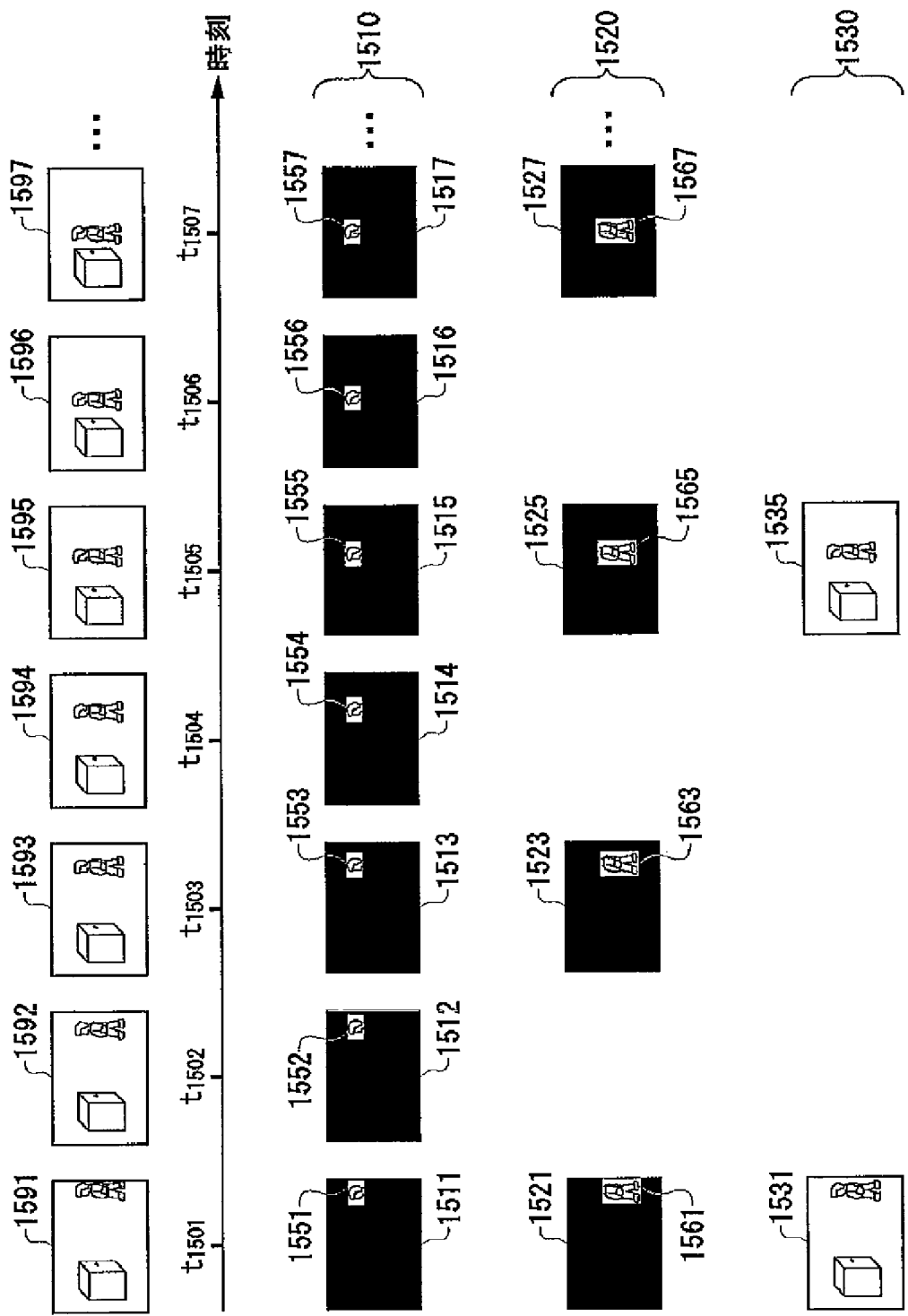
FIG. 15 shows one example of the motion image generated by the output motion image generating section 282.

FIG. 15 shows another example of the motion image generated by the output motion image generating section 282. The output motion image generating section 282 identifies human face regions 1551-1557 respectively from the images 1591-1597 captured at the time t1501—the time t1507 by the image capturing apparatus 100. Then the output motion image generating section 282 generates the object region images 1511-1517 by setting the pixel value for the region other than the regions 1551-1557 to a predetermined value. In this way, the output motion image generating section 282 generates the output motion image 1510 that includes the object region images 1511-1517.

In addition, the output motion image generating section 282 identifies the human body regions 1561, 1563, 1565, and 1567 in the image in which the resolution is reduced by thinning the pixels from the images 1591, 1593, 1595, and 1597. Then the output motion image generating section 282 generates the object region images 1521, 1523, 1525, and 1527 by setting the pixel value for the region other than the regions 1561, 1563, 1565, and 1567 to a predetermined value. In this way, the output motion image generating section 282 generates the output motion image 1520 that includes the object region images 1521, 1523, 1525, and 1527.

In addition, the output motion image generating section 282 generates background region images 1531 and 1535, which are the images of the regions other than the object region, by further reducing the resolution of the images 1591 and 1595. In this way, the output motion image generating section 282 generates the motion images 1510, 1520, and 1530 that are different in resolution and display rate from each other. Note that in the example of the present drawing, the motion image 1510 is of a higher image quality than the motion image 1520, and the motion image 1520 is of a higher image quality than the motion image 1530. In this way, the output motion image generating section 282 generates a motion image of a resolution and a display rate predetermined according to the object type. Note that the object type may also be identified by a condition or a combination of a plurality of conditions stored in the condition storing section 240, besides a human face or a human body explained with reference to the present drawing.

Then the output control section 270 selects the motion image transmittable within the range of the permissible data amount from the output section 290, based on the data amount of the motion image. For example, the output control section 270 selects a motion image transmittable within the permissible data amount from the output section 290 in the order of the motion image 1510, the motion image 1520, and the motion image 1530. Note that as explained with reference to FIG. 9 and so on, the output control section 270 controls the output section 290 to transmit a frame image included in an unselected motion image for transmission at a later timing when it becomes possible to transmit the same.

Note that the output motion image generating section 282 may perform compression coding to the plurality of object region images included, in the unit of the motion image 1510, the motion image 1520, and the motion image 1530. In this way, the output motion image generating section 282 performs the compression coding after rendering, to be a predetermined value, the pixel value of the region other than the object region. According to this, it becomes possible to notably reduce the data amount of the motion image while using a general-purpose encoder.

Figure 16:
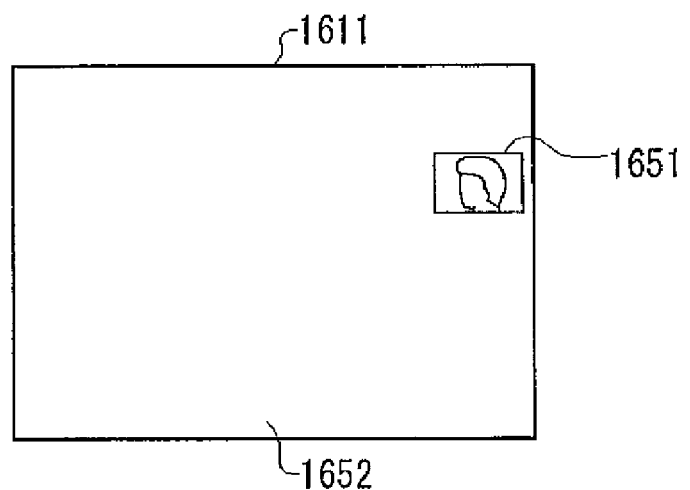
FIG. 16 shows one example of the frame image included in a different image generated by the output motion image generating section 282.
Figure 16:
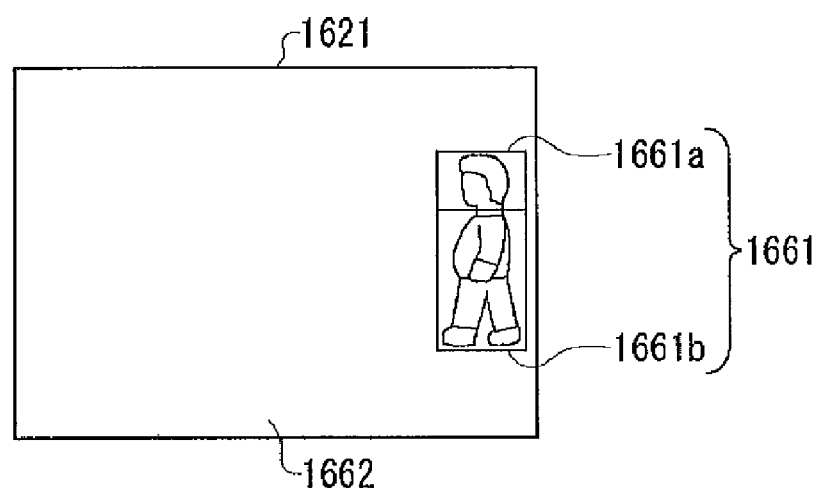
Figure 16:
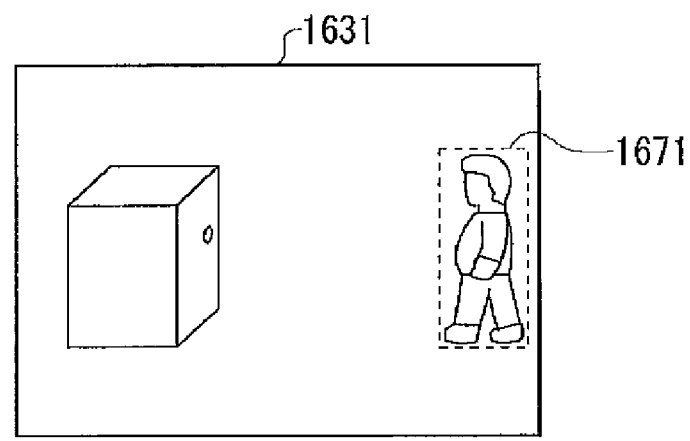

FIG. 16 shows one example of the motion image constituting image included in a different motion image generated by the output motion image generating section 282. The output motion image generating section 282 generates a lower resolution image 1631 reduced by thinning the pixels of the image 1591. In addition, the output motion image generating section 282 generates a medium resolution image reduced by thinning the pixels of the image 1591. Here, note that the medium resolution image is assumed to have a higher resolution than the low resolution image. Also note that the low resolution image 1631 includes a human being region 1671 having a low resolution.

In addition, the output motion image generating section 282 generates a differential image 1621 from a difference between the medium resolution image and the low resolution image 1631. Here, the output motion image generating section 282 sets the pixel difference value in the region other than the human being region 1661 in the differential image 1621 to 0. According to this operation, the image content of the region other than the human being region 1661 (a head region 1661a and a body region 1661b) in the differential image 1621 becomes substantially equal to the image content of the low resolution image 1631.

In addition, the output motion image generating section 282 generates a differential image 1611 from a difference between the image 1591 and the medium resolution image. Here, the output motion image generating section 282 sets the pixel difference value in the region other than the human head region 1651 in the differential image 1611, to 0. According to this operation, the image content of the region other than the head region 1651 in the differential image 1611 becomes substantially equal to the image content of the low resolution image 1621.

In this way, the output motion image generating section 282 breaks down the image 1591 into a low resolution image 1631 having a so-called low fineness, a differential image 1621 having a medium level fineness for the human being region 1661, and a differential image 1611 having a high fineness for the human head region. In an image resulting from adding up these images, the human being region has a higher fineness than in the other regions, and that the head region has a higher fineness than in the other regions within the human being region. Accordingly, the image resulting from adding up will have a data amount notably smaller than the original image 1591.

Note that the explanation so far is about a generating method for generating a plurality of object region images from one image 1591. However it is possible to generate a plurality of object region images from a plurality of images respectively, in the similar manner. The output motion image generating section 282 generates a motion image where differential images having the same resolution are designated as a set of motion image constituting images.

Note that the differential image 1621 and the differential image 1611 may be one example of the object region image of the present invention. In addition, the output control section 270 selects the motion image transmittable within the range of the permissible data amount from the output section 290, based on the data amount of the motion image and the permissible data amount. Note that as already described above, the object region image included in the untransmittable motion image is stored in the image retaining section 214 for later transmission.

Note that as described above with reference to this drawing, when the output motion image generating section 282 has generated a differential image as an object region image, an image of a low resolution becomes necessary to restore the image of the human being region. Therefore in such a case, it is desirable that the output control section 270 transmits an object region image of a lower resolution, as a priority.

Figure 17:
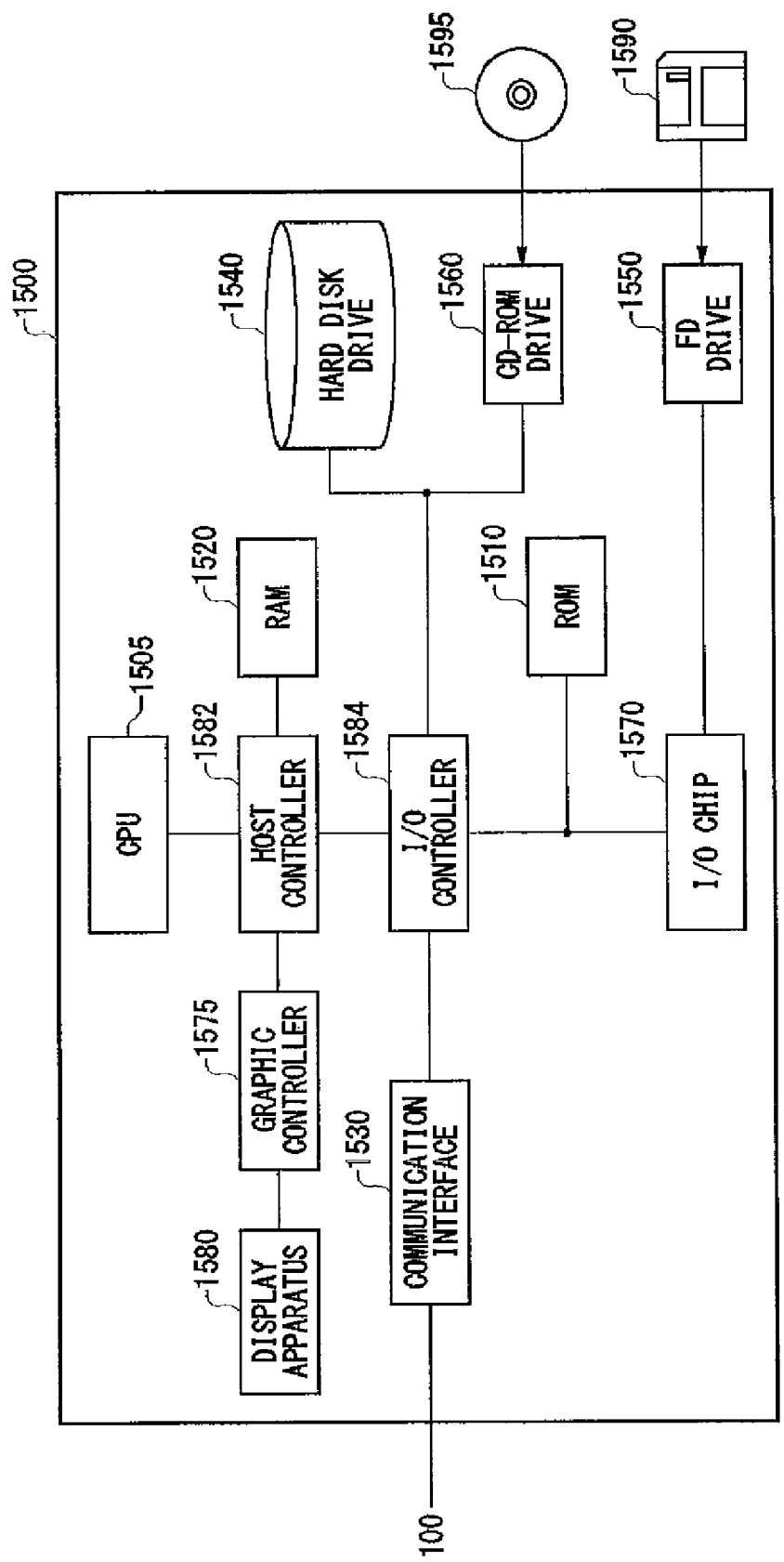
FIG. 17 shows one example of a hardware configuration of a computer 1500 regarding the image capturing apparatus 100.

FIG. 17 shows an exemplary hardware configuration of the computer 1500 according to the monitoring system 110. The computer 1500 is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and a input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 acquires image data generated by the CPU 1505 or the like on a frame buffer disposed inside the RAM 1520 and displays the image data in the display apparatus 1580. In addition, the graphic controller 1575 may internally include the frame buffer storing the image data generated by the CPU 1505 or the like.

The input/output controller 1584 connects the hard disk drive 1540 serving as a relatively high speed input/output apparatus, the communication interface 1530, and the CD-ROM drive 1560 to the host controller 1582. The hard disk drive 1540 stores the programs and data used by the CPU 1505 housed in the computer 1500. The communication interface 1530 communicates with the information capturing apparatus 100 via a network, and provides the image capturing apparatus 100 with the programs and data. The CD-ROM drive 1560 reads the programs and data from a CD-ROM 1595 and provides the read information to the communication interface 1530 and to the hard disk drive 1540 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the computer 1500 starts up, a program relying on the hardware of the computer 1500, and the like. The flexible disk drive 1550 reads programs or data from a flexible disk 1590 and supplies the read programs or data to the communication interface 1530 and the hard disk drive 1540 via the RAM 1520. The input/output chip 1570 connects the flexible disk drive 1550 to a variety of input/output apparatuses via, for example, a parallel port, a serial port, a keyboard port, a mouse port, or the like.

A program provided to the communication interface 1530 via the RAM 1520 is provided by a user in a state where it is stored in a storage medium, such as the flexible disk 1590, the CD-ROM 1595, or an IC card. The program is read from the storage medium, provided in the communication interface 1530 via the RAM 1520, and transmitted to the image capturing apparatus 100 via a network. The program transmitted to the image capturing apparatus 100 is installed in the image capturing apparatus 100 and executed.

The program executed by being installed in the image capturing apparatus 100 causes the image capturing apparatus 100 to function as an image capturing section 200, an averaged image generating section 202, an image capturing control section 210, an object region identifying section 212, an image retaining section 214, a differential image generating section 216, a change amount calculating section 221, a motion amount calculating section 222, a motion direction identifying section 223, a peculiar color area calculating section 224, an object extraction section 225, a matching judging section 230, a matching level calculating section 232, a condition storing section 240, a condition designating section 242, a permissible data amount obtaining section 250, an image quality selection section 260, an image quality storing section 262, an output control section 270, an image generating section 280, an output motion image generating section 282, and an output section 290, as explained with reference to the drawings from FIG. 1 to FIG. 16.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the computer 1500 via the network.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. A monitoring system comprising:
   an image capturing section that captures a motion image of a monitor region;
   a condition storing section that stores a condition of an object to be extracted from the motion image captured by the image capturing section;
   a matching judging section that judges whether an object that matches the condition exists in the motion image captured by the image capturing section;
   an object region identifying section that identifies an object region that includes the object that matches the condition, if the matching judging section has judged that the object that matches the condition exists;
   an output section that outputs an image of the object region, if the matching judging section has judged that the object that matches the condition exists;
   an image retaining section that retains an image of a region other than the object region, if the matching judging section has judged that the object that matches the condition exists; and
   an output control section that controls the output section to output the image of the region other than the object region retained in the image retaining section, if it is judged that the image of the region other than the object region retained in the image retaining section is to be transmitted, after the image retaining section retained the image of the region other than the object region.

2. The monitoring system as set forth in claim 1, wherein the output control section controls the output section to output the image of the region other than the object region retained in the image retaining section, if it is judged that the image of the region other than the object region retained in the image retaining section is transmittable, after the image retaining section retained the image of the region other than the object region.

3. The monitoring system as set forth in claim 2, wherein the output control section controls the output section to output the image of the region other than the object region retained in the image retaining section, if it is judged that a data amount of the motion image to be outputted from the output section is smaller than a predetermined data amount, after the image retaining section retained the image of the region other than the object region.

4. The monitoring system as set forth in claim 3, further comprising:
   a permissible data amount obtaining section that obtains a data amount permitted to be outputted from the output section per unit time, wherein
   the output control section controls the output section to output the image of the region other than the object region retained in the image retaining section, if it is judged that a data amount of the motion image to be outputted from the output section per unit time is smaller than the data amount obtained by the permissible data amount obtaining section, after the image retaining section retained the image of the region other than the object region.

5. The monitoring system as set forth in claim 2, wherein the output control section controls the output section to output the image of the region other than the object region retained in the image retaining section, within a range of the data amount permitted to be outputted from the output section.

6. The monitoring system as set forth in claim 2, further comprising:
a permissible data amount obtaining section that obtains a data amount permitted to be outputted from the output section per unit time, wherein
the output control section controls the output section to output the image of the region other than the object region retained in the image retaining section, if it is judged that the data amount obtained by the permissible data amount obtaining section is larger than a predetermined value, after the image retaining section retained the image of the region other than the object region.

7. The monitoring system as set forth in claim 1, wherein the output control section controls the output section to output the image of the region other than the object region retained in the image retaining section, if a difference between the image content of the region other than the object region in the motion image of the monitor region after the image retaining section retained the image of the region other than the object region and the image content of the region other than the object region retained in the image retaining section is larger than a predetermined value.

8. The monitoring system as set forth in claim 1, wherein the output control section controls the output section to output the image of the region other than the object region retained in the image retaining section, if it is judged that a time of a time width longer than a predetermined time width has elapsed after the image retaining section retained the image of the region other than the object region.

9. The monitoring system as set forth in claim 1, wherein the output control section controls the output section to output the image of the region other than the object region retained in the image retaining section, if the matching judging section has judged that there does not exist any object that matches the condition in the motion image of the monitor region after the image retaining section retained the image of the region other than the object region.

10. The monitoring system as set forth in claim 1, wherein the condition storing section stores a lower limit value of a motion amount of the object to be extracted from the motion image, and
the object region identifying section identifies a region including an object whose motion amount of the object throughout a plurality of motion image constituting images included in the motion image captured by the image capturing section is the lower limit value of the motion amount stored in the condition storing section or more, as the object region.

11. The monitoring system as set forth in claim 1, wherein the condition storing section stores a lower limit value of a matching level with a predetermined object, which an object to be extracted from the motion image should have, and
the object region identifying section extracts a region including an object that matches with a matching level being the lower limit value of the matching level stored in the condition storing section or more, as the object region.

12. The monitoring system as set forth in claim 1, wherein the condition storing section stores a lower limit value of an area occupied by a color included in a predetermined color range to be included in an object to be extracted from the motion image, and
the object region identifying section extracts a region including an object whose area occupied by the color included in the predetermined color range is the lower limit value of the area stored in the condition storing section or more, as the object region.

13. The monitoring system as set forth in claim 9 further comprising:
a permissible data amount obtaining section that obtains a data amount permitted to be outputted from the output section per unit time, wherein
if the matching judging section has judged that there does not exist any object that matches the condition in the motion image of the monitor region after the image retaining section retained the image of the region other than the object region, the output control section controls the output section to output the image of the region other than the object region retained in the image retaining section, on condition that the data amount obtained by the permissible data amount obtaining section is larger than a predetermined value.

14. The monitoring system as set forth in claim 9, further comprising:
a permissible data amount obtaining section that obtains a data amount permitted to be outputted from the output section per unit time, wherein
if the matching judging section has judged that there does not exist any object that matches the condition in the motion image of the monitor region after the image retaining section retained the image of the region other than the object region, the output control section controls the output section to output the image of the region other than the object region retained in the image retaining section, with an image quality that is in accordance with the data amount obtained by the permissible data amount obtaining section.

15. The monitoring system as set forth in claim 9, further comprising:
a permissible data amount obtaining section that obtains a data amount permitted to be outputted from the output section per unit time, wherein
if the matching judging section has judged that the object that matches the condition exists, the output section outputs an image of the object region with a higher image quality for a larger data amount obtained by the permissible data amount obtaining section.

16. The monitoring system as set forth in claim 9, further comprising:
a permissible data amount obtaining section that obtains a data amount permitted to be outputted from the output section per unit time, wherein
if the matching judging section has judged that the object that matches the condition exists, the object region identifying section identifies a larger object region including the object that matches the condition for a larger data amount obtained by the permissible data amount obtaining section.

17. The monitoring system as set forth in claim 1, wherein if the matching judging section has judged that a plurality of objects that match the condition exist, the object region identifying section identifies a plurality of object regions including the plurality of objects that match the condition respectively,
the output section outputs an image of an object region that includes an object having a higher priority predetermined according to an object feature type, if the matching judging section has judged that a plurality of objects that match the condition exist, the image retaining section retains an image of an object region not having been outputted from the output section and the image of the region other than the object region, if the matching judging section has judged that a plurality of objects that match the condition exist, and the output control section controls the output section to output the image retained in the image retaining section if it is judged that the image retained in the image retaining section is to be transmitted, after the image retaining section retained the image of the region other than the object region.

18. The monitoring system as set forth in claim 17, wherein the output section outputs, as a priority, the image of the object region that includes the object having a higher priority predetermined according to an object feature type, so as to reduce, down to a predetermined data amount or less, an data amount of an image of the object region to be outputted.

19. The monitoring system as set forth in claim 17, wherein the output control section controls the output section to output the image of the object region retained in the image retaining section prior to the image of the region other than the object region, if it is judged that the image retained in the image retaining section is to be transmitted, after the image retaining section retained the image of the region other than the object region.

20. The monitoring system as set forth in claim 1, wherein if the matching judging section has judged that a plurality of objects that match the condition exist, the object region identifying section identifies a plurality of object regions including the plurality of objects that match the condition respectively, the monitoring system further comprises:

an image generating section that generates an object region image being an image of an object region of an image quality different according to an object type, for each object feature type that matches the condition, the output section outputs, as a priority, an object region image of a higher image quality generated by the image generating section, if the matching judging section has judged that a plurality of objects that match the condition exist, the image retaining section retains an image of an object region not having been outputted from the output section and the image of the region other than the object region, if the matching judging section has judged that a plurality of objects that match the condition exist, and the output control section controls the output section to output the image retained in the image retaining section if it is judged that the image retained in the image retaining section is to be transmitted, after the image retaining section retained the image of the region other than the object region.

21. The monitoring system as set forth in claim 1, wherein if the matching judging section has judged that a plurality of objects that match the condition exist, the object region identifying section identifies a plurality of object regions including the plurality of objects that match the condition respectively, the monitoring system further comprises:

an image generating section that generates an object region image being an image of an object region of a resolution different according to an object type, for each object feature type that matches the condition, and generates a differential image between a high resolution object region image and a low resolution object region image having been generated, the output section outputs an object region image of a lower resolution generated by the image generating section, prior to the differential image, if the matching judging section has judged that a plurality of objects that match the condition exist, the image retaining section retains the differential image not having been outputted from the output section and the image of the region other than the object region, if the matching judging section has judged that a plurality of objects that match the condition exist, and the output control section controls the output section to output the image retained in the image retaining section if it is judged that the image retained in the image retaining section is to be transmitted, after the image retaining section retained the image of the region other than the object region.

22. A monitoring method comprising:

an image capturing step of capturing a motion image of a monitor region;

a condition storing step of storing a condition of an object to be extracted from the motion image captured in the image capturing step;

a matching judging step of judging whether an object that matches the condition exists in the motion image captured in the image capturing step;

an object region identifying step of identifying an object region that includes the object that matches the condition, if the object that matches the condition is judged to exist in the matching judging step;

an output step of outputting an image of the object region, if the object that matches the condition is judged to exist in the matching judging step;

an image retaining step of retaining an image of a region other than the object region, if the object that matches the condition is judged to exist in the matching judging step; and an output control step of controlling to output, in the output step, the image of the region other than the object region retained in the image retaining step, if it is judged that the image of the region other than the object region retained in the image retaining step is to be transmitted, after the image of the region other than the object region is retained in the image retaining step.

23. A non-transitory computer readable medium storing a program for use in a monitoring system, the program causing the monitoring system to function as: an image capturing section that captures a motion image of a monitor region; a condition storing section that stores a condition of an object to be extracted from the motion image captured by the image capturing section; a matching judging section that judges whether an object that matches the condition exists in the motion image captured by the image capturing section; an object region identifying section that identifies an object region that includes the object that matches the condition, if the matching judging section has judged that the object that matches the condition exists; an output section that outputs an image of the object region, if the matching judging section has judged that the object that matches the condition exists; an image retaining section that retains an image of a region other than the object region, if the matching judging section has judged that the object that matches the condition exists; and an output control section that controls the output section to output the image of the region other than the object region retained in the image retaining section, if it is judged that the image of the region other than the object region retained in the image retaining section is to be transmitted, after the image retaining section retained the image of the region other than the object region.

* * * * *